(12) United States Patent
Velazquez Alcantar et al.

(10) Patent No.: US 11,161,514 B2
(45) Date of Patent: Nov. 2, 2021

(54) SYSTEM AND METHOD FOR COORDINATING INDEPENDENT AXLES FOR CONTINUOUS WHEEL SLIP CONTROL

(71) Applicant: Ford Global Technologies, LLC, Dearborn, MI (US)

(72) Inventors: Jose Velazquez Alcantar, Canton, MI (US); Joe Jay Torres, Dearborn, MI (US); Lucian Lippok, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 133 days.

(21) Appl. No.: 16/569,547

(22) Filed: Sep. 12, 2019

(65) Prior Publication Data

US 2021/0078581 A1   Mar. 18, 2021

(51) Int. Cl.
*B60W 30/18* (2012.01)
*B60L 50/50* (2019.01)
*B60W 50/038* (2012.01)

(52) U.S. Cl.
CPC ....... *B60W 30/18172* (2013.01); *B60L 50/50* (2019.02); *B60W 50/038* (2013.01); *B60W 2520/14* (2013.01); *B60W 2520/263* (2013.01); *B60W 2540/10* (2013.01)

(58) Field of Classification Search
CPC ......... B60W 30/18172; B60W 50/038; B60W 2540/10; B60W 2520/15; B60W 2520/263; B60L 50/50
See application file for complete search history.

(56) References Cited

U.S. PATENT DOCUMENTS

| 9,469,199 | B1 | 10/2016 | Gauthier | |
| 2005/0256629 | A1 | 11/2005 | Tao et al. | |
| 2013/0211640 | A1* | 8/2013 | Maier | B60W 10/06 701/22 |
| 2018/0237015 | A1 | 8/2018 | Nasu et al. | |
| 2018/0339698 | A1* | 11/2018 | Hock | B60K 6/448 |
| 2019/0054826 | A1* | 2/2019 | Greenwood | B60L 15/20 |
| 2019/0221745 | A1* | 7/2019 | Yoshioka | H01L 27/14 |
| 2020/0094808 | A1* | 3/2020 | David | F16H 13/06 |

* cited by examiner

*Primary Examiner* — Marthe Y Marc-Coleman
(74) *Attorney, Agent, or Firm* — David Kelley; McCoy Russell LLP

(57) ABSTRACT

Methods and system are described for controlling wheel slip of a four wheel drive vehicle. The methods and system may be applied to an electric vehicle or a hybrid vehicle. The method and system provide for operating vehicle propulsion sources in speed and torque control modes to manage wheel slip.

18 Claims, 12 Drawing Sheets

SYSTEM AND METHOD FOR COORDINATING INDEPENDENT AXLES FOR CONTINUOUS WHEEL SLIP CONTROL

FIELD

The present description relates generally to methods and systems for providing wheel slip control for an electric or hybrid vehicle. The electric or hybrid vehicle may include two independent electric machines that may provide power to a front axle and a rear axle.

BACKGROUND/SUMMARY

A vehicle may include an internal combustion engine as a propulsion source. The vehicle's human driver may request torque from the engine via an accelerator pedal. The accelerator pedal's position may be input to the controller and the input may be processed as a driver torque demand. The controller then converts the driver torque demand into a command for vehicle's engine. If the driver is requesting a larger amount of torque or if a coefficient of friction between the vehicle's tires and the road surface is low, then the vehicle's wheels may slip. If the vehicle's wheels slip, then a torque control algorithm in the vehicle's braking system may request an engine torque reduction. The engine torque reduction may be implemented via spark retard since spark timing adjustments may respond more quickly than air flow adjustments to control engine torque production. However, powertrain efficiency may be reduced significantly when spark retard is used to control wheel torque. Further, while engine torque may be adjusted quicker via spark timing than via engine air flow adjustments, spark timing adjustments may still not adjust engine torque as quickly as may be desired to limit and control wheel slip.

The inventors herein have recognized the above-mentioned issues and have developed a method for operating a vehicle, comprising: operating an electric machine of a first axle in a torque control mode via a controller; and exiting the torque control mode and entering the electric machine of the first axle in to a speed control mode via the controller in response to an indication of a wheel of the first axle slipping.

By switching an operating mode of an electric machine from a torque control mode to a speed control mode, it may be possible to provide the technical result of improving wheel slip control without significantly reducing driveline efficiency. Further, the wheel slip control may be quick to respond to changes in road surfaces and other driving conditions. In addition, a speed of an electric machine may directly reflect wheel speed, so controlling wheel slip via controlling electric machine speed may provide improved wheel slip control as compared to controlling wheel torque to limit wheel slip. In addition, a driver's torque demand may still be met even though one wheel of an axle may begin to slip. In particular, wheels of a second axle may be supplied with torque to meet the driver demand torque while a speed and torque of the slipping wheel are reduced to control wheel slip.

The present description may provide several advantages. In particular, the approach allows a driveline to switch from a torque control mode to a speed control mode so that more precise wheel slip control may be provided. In addition, the approach allows different axles to operate in different modes so that traction may be maintained while a requested driver demand torque is met. Further, the approach also provides compensation for vehicle yaw and split-Mu driving surfaces.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
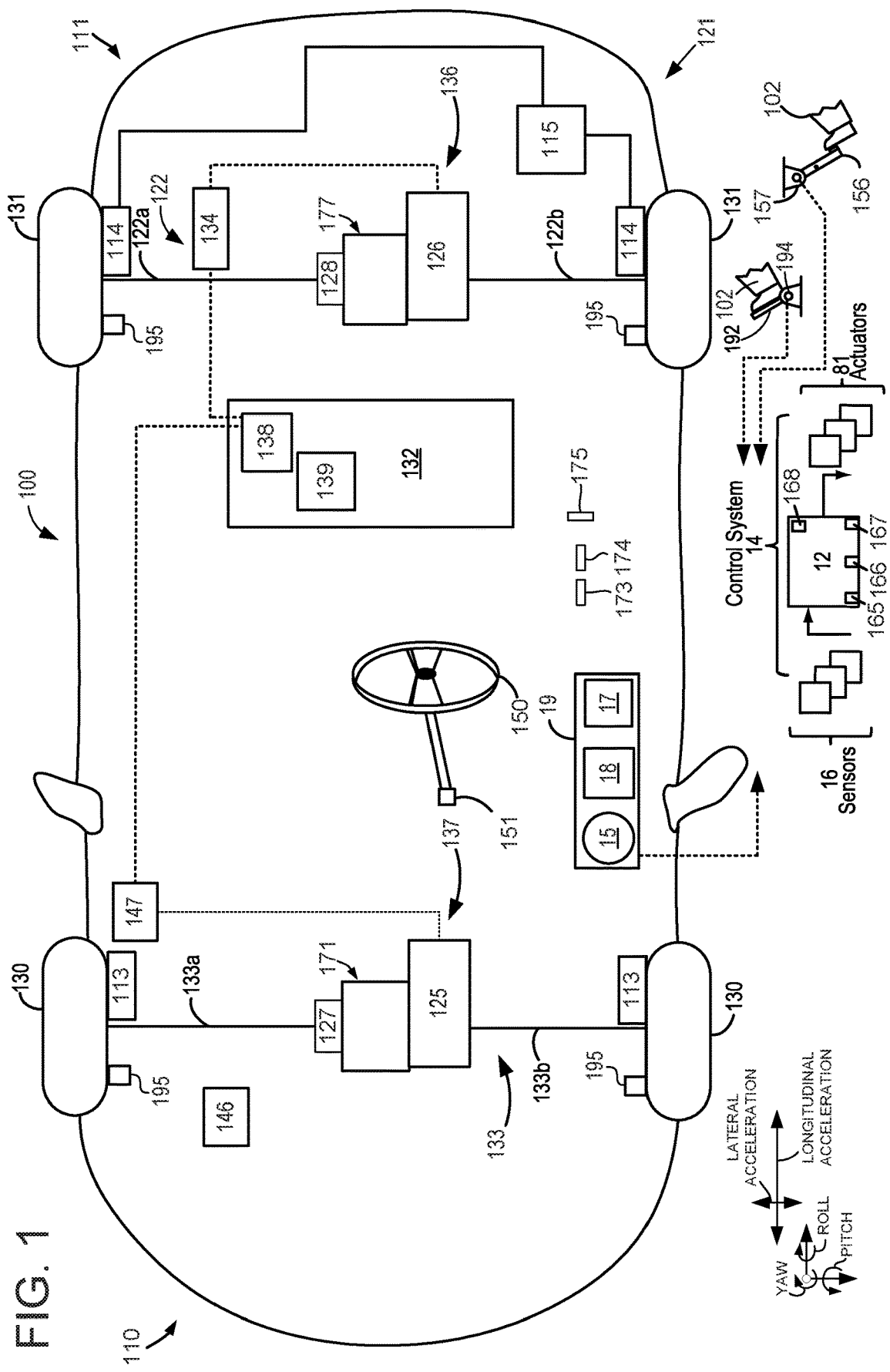
FIG. 1 is a schematic diagram of a vehicle driveline is shown.
Figure 13:
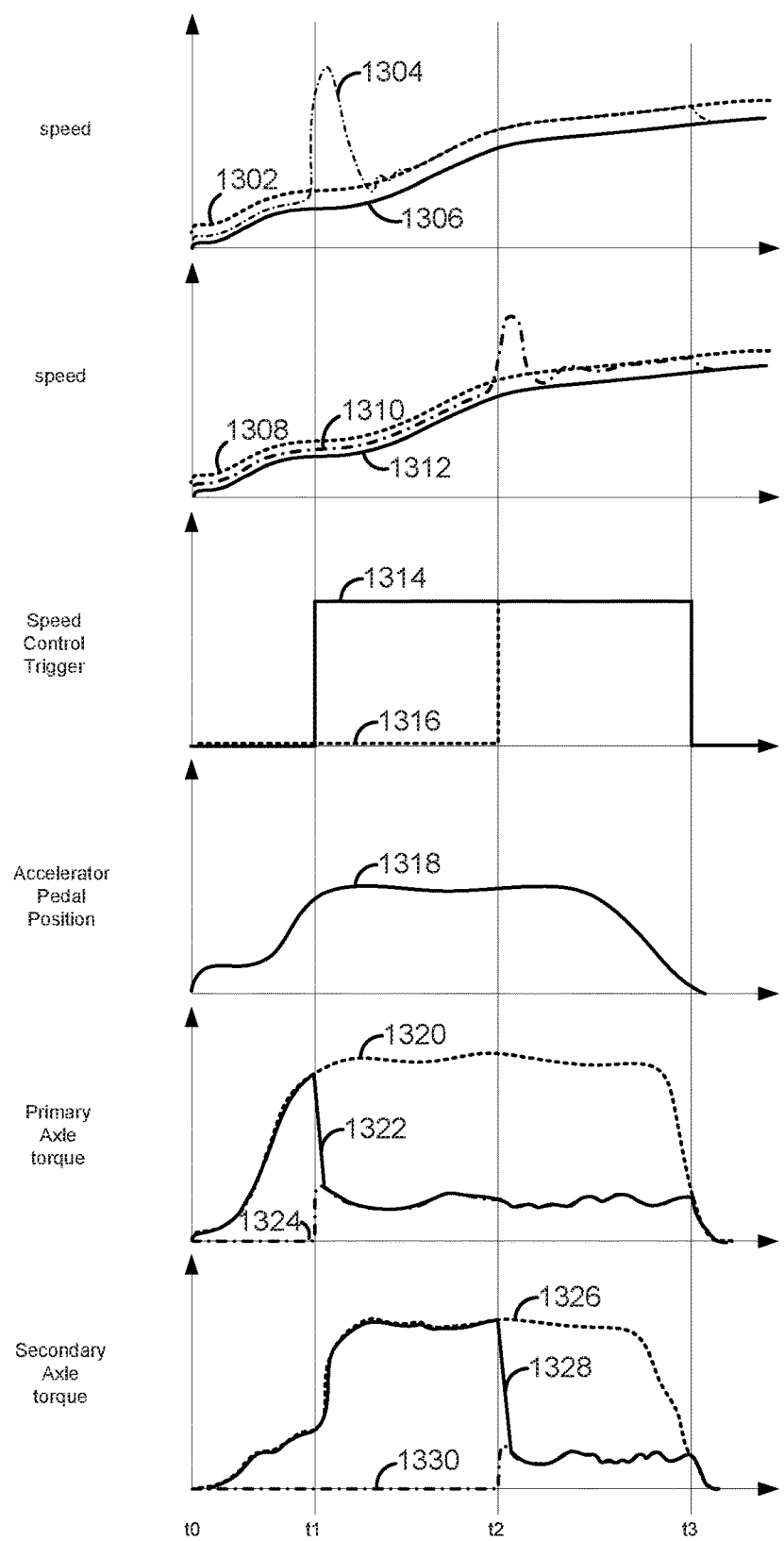
FIGS. 13-15 show example operating sequences of a vehicle according to the method of FIGS. 2-12.
Figure 14:
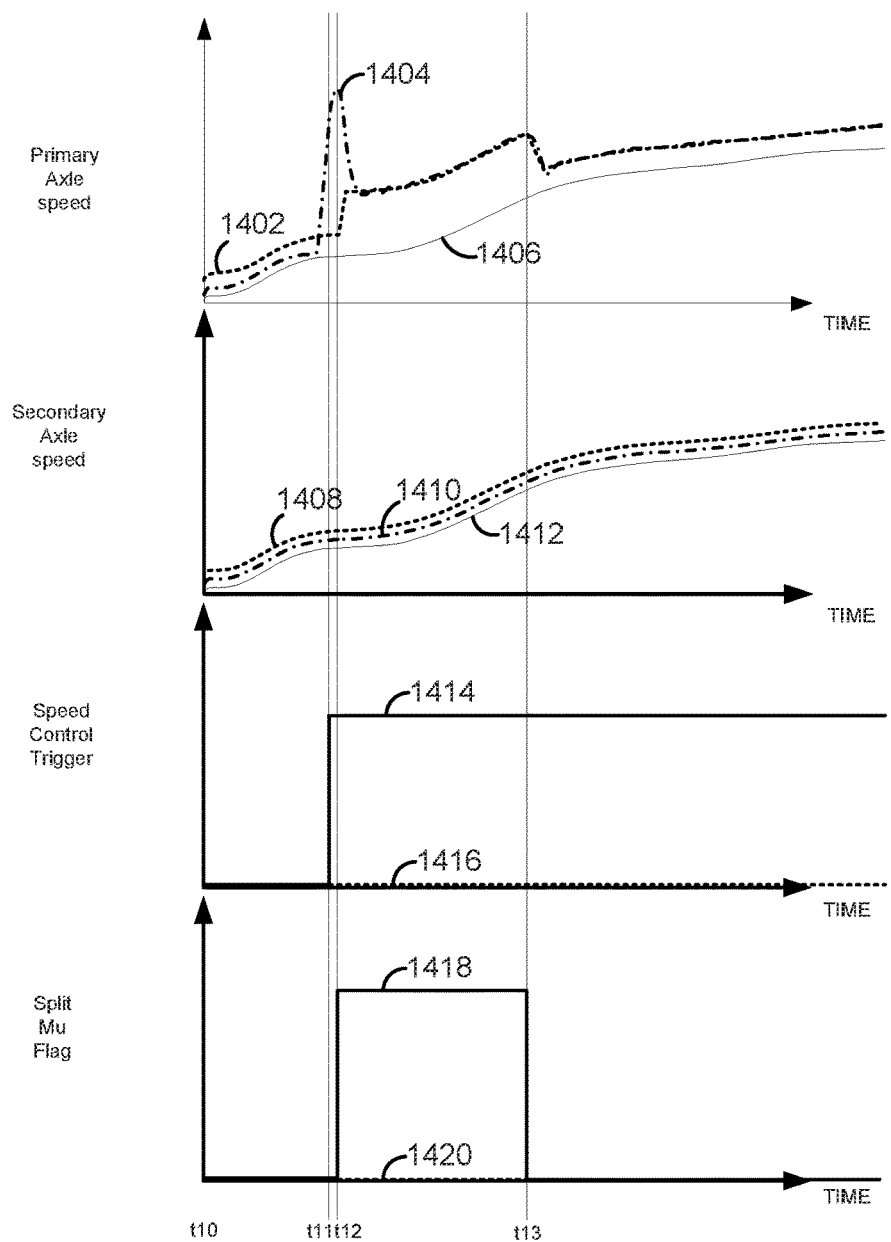
Figure 15:
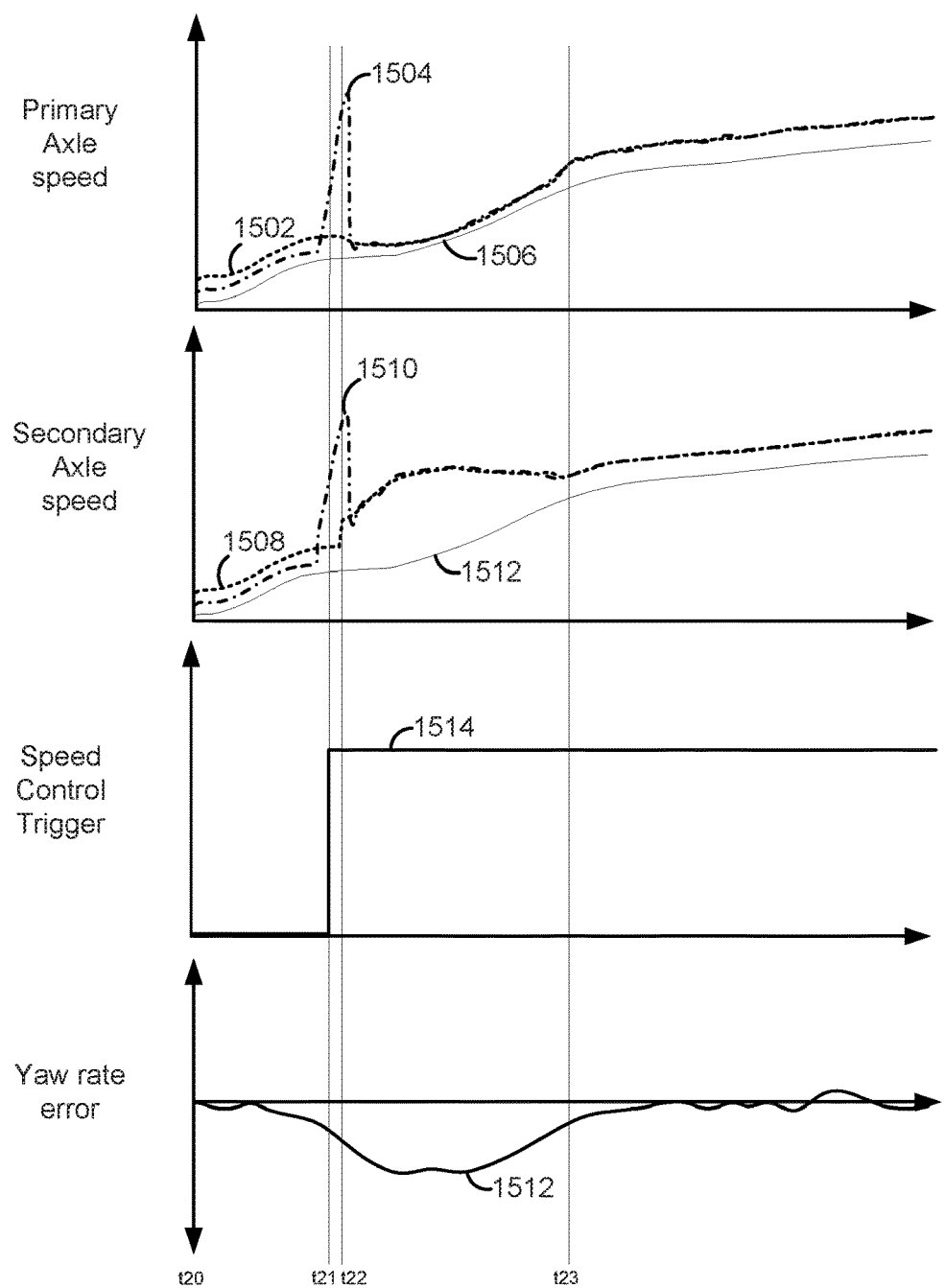

The following description relates to systems and methods for operating a driveline or powertrain of a four wheel drive vehicle. The four wheel drive vehicle may be configured as an electric vehicle, or alternatively, the vehicle may be configured as a hybrid vehicle. An example vehicle and driveline or powertrain is shown in FIG. 1. FIGS. 2-12 show an example method for operating the vehicle and controlling wheel slip. FIGS. 13-15 show three different operating sequences according to the method of FIGS. 2-12. As discussed herein, wheel slip is a relative speed difference between a tire contact patch with a surface that the tire is rolling on. Wheel slip may be generated when there is a speed difference between the tire's present speed and the tire's free rolling speed (e.g., the tire's speed at the present vehicle speed with no torque being applied to the tire or the wheel that the tire is coupled to).

FIG. 1 illustrates an example vehicle propulsion system 100 for vehicle 121. A front portion of vehicle 121 is indicated at 110 and a rear portion of vehicle 121 is indicated at 111. Vehicle propulsion system 100 includes at two propulsion sources including front electric machine 125 and rear electric machine 126. Electric machines 125 and 126 may consume or generate electrical power depending on their operating mode. Throughout the description of FIG. 1, mechanical connections between various components are illustrated as solid lines, whereas electrical connections between various components are illustrated as dashed lines.

Vehicle propulsion system 100 has a front axle 133 and a rear axle 122. Rear axle 122 may be referred to as the primary axle and front axle 133 may be referred to as the secondary axle. In some examples, rear axle may comprise two half shafts, for example first half shaft 122a, and second half shaft 122b. Likewise, front axle 133 may comprise a first half shaft 133a and a second half shaft 133b. Vehicle propulsion system 100 further has front wheels 130 and rear wheels 131. In this example, front wheels 130 may be selectively driven via electric machine 125. Rear wheels 131 may be driven via electric machine 126.

The rear axle 122 is coupled to electric machine 126. Rear drive unit 136 may transfer power from electric machine 126 to axle 122 resulting in rotation of drive wheels 131. Rear drive unit 136 may include a gearbox 177 that is coupled to electric machine 126. Gearbox 177 may transmit torque from electric machine 126 to open differential gear set 128. Differential 128 may transmit torque to axle 122a and to axle 122*b*. In some examples, an electrically controlled differential clutch (not shown) may be included in differential 128.

The front axle 133 is coupled to electric machine 125. Front drive unit 137 may transfer power from electric machine 125 to axle 133 resulting in rotation of drive wheels 130. Front drive unit 137 may include a gearbox 171. Gearbox 171 may transmit torque from electric machine 125 to open differential gear set 127. Differential 127 may transmit torque to axle 133*a* and to axle 133*b*. In some examples, an electrically controlled differential clutch (not shown) may be included in differential 127.

Electric machines 125 and 126 may receive electrical power from onboard electrical energy storage device 132. Furthermore, electric machines 125 and 126 may provide a generator function to convert the vehicle's kinetic energy into electrical energy, where the electrical energy may be stored at electric energy storage device 132 for later use by the electric machine 125 and/or electric machine 126. A first inverter system controller (ISC1) 134 may convert alternating current generated by rear electric machine 126 to direct current for storage at the electric energy storage device 132 and vice versa. A second inverter system controller (ISC2) 147 may convert alternating current generated by front electric machine 125 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc.

Control system 14 may communicate with one or more of electric machine 125, electric machine 126, inverter 147, inverter 134, energy storage device 132, etc. Control system 14 may receive sensory feedback information from one or more of electric machine 125, electric machine 126, energy storage device 132, inverter 147, inverter 134, etc. Further, control system 14 may send control signals to one or more of electric machine 125, electric machine 126, energy storage device 132, inverter 134, inverter 147, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to an accelerator pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

Energy storage device 132 may periodically receive electrical energy from a power source such as a stationary power grid (not shown) residing external to the vehicle (e.g., not part of the vehicle). As a non-limiting example, vehicle propulsion system 100 may be configured as a plug-in electric vehicle (EV), whereby electrical energy may be supplied to energy storage device 132 via the power grid (not shown).

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include a motor electronics coolant pump (MECP) 146. MECP 146 may be used to circulate coolant to diffuse heat generated by at least electric machine 120 of vehicle propulsion system 100, and the electronics system. MECP may receive electrical power from onboard energy storage device 132, as an example.

An angle or position of steering wheel 150 may be determined via steering angle sensor 151 for use via vehicle stability control and traction control systems. If the vehicle does not include a steering wheel, such as for an autonomous vehicle, then steering angle may be determined via a position of steering linkage (not shown).

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include tire pressure sensor(s) (not shown), wheel speed sensor(s) 195, yaw rate sensor 173, lateral acceleration sensor 174, longitudinal acceleration sensor 175, steering angle sensor 151, etc. In some examples, sensors associated with electric machine 125, electric machine 126, wheel speed sensor 195, etc., may communicate information to controller 12, regarding various states of electric machine operation. Controller 12 includes non-transitory (e.g., read only memory) 165, random access memory 166, analog/digital inputs/outputs 168, and a microcontroller 167.

Vehicle propulsion system 100 may also include an on-board navigation system 17 (for example, a Global Positioning System) on dashboard 19 that an operator of the vehicle may interact with. The navigation system 17 may include one or more location sensors for assisting in estimating a location (e.g., geographical coordinates) of the vehicle. For example, on-board navigation system 17 may receive signals from GPS satellites (not shown), and from the signal identify the geographical location of the vehicle. In some examples, the geographical location coordinates may be communicated to controller 12.

Dashboard 19 may further include a display system 18 configured to display information to the vehicle operator. Display system 18 may comprise, as a non-limiting example, a touchscreen, or human machine interface (HMI), display which enables the vehicle operator to view graphical information as well as input commands. In some examples, display system 18 may be connected wirelessly to the internet (not shown) via controller (e.g. 12). As such, in some examples, the vehicle operator may communicate via display system 18 with an internet site or software application (app).

Dashboard 19 may further include an operator interface 15 via which the vehicle operator may adjust the operating status of the vehicle. Specifically, the operator interface 15 may be configured to initiate and/or terminate operation of the vehicle driveline (e.g., electric machine 125 and electric machine 126) based on an operator input. Various examples of the operator ignition interface 15 may include interfaces that require a physical apparatus, such as an active key, that may be inserted into the operator interface 15 to start the electric machines 125 and 126 and to turn on the vehicle, or may be removed to shut down the electric machines 125 and 126 to turn off the vehicle. Other examples may include a passive key that is communicatively coupled to the operator interface 15. The passive key may be configured as an electronic key fob or a smart key that does not have to be inserted or removed from the interface 15 to operate the vehicle electric machines 125 and 126. Rather, the passive key may need to be located inside or proximate to the vehicle (e.g., within a threshold distance of the vehicle). Still other examples may additionally or optionally use a start/stop button that is manually pressed by the operator to start or shut down the electric machines 125 and 126 to turn the vehicle on or off. In other examples, a remote electric machine start may be initiated remote computing device (not shown), for example a cellular telephone, or smartphone-based system where a user's cellular telephone sends data to a server and the server communicates with the vehicle controller 12 to start the engine.

Vehicle 121 also includes a braking system that includes front friction or foundation brakes 113, rear friction brakes 114, and a braking controller 115. Braking controller 115 may respond to a position of brake pedal 156 and commands from controller 12.

The system of FIG. 1 provides for a vehicle system, comprising: a first electric machine coupled to a first axle; a second electric machine coupled to a second axle; a controller including executable instructions stored in non-transitory memory to operate the first electric machine in a first torque control mode and the second electric machine in a second torque control mode in response to absence of wheel slip, and to operate the first electric machine or the second electric machine in a speed control mode in response to an indication of wheel slip. The vehicle system further comprises additional instructions to adjust a requested speed in the speed control mode in response to vehicle speed and accelerator pedal position. The vehicle system further comprises additional instructions to adjust a requested speed in the speed control mode in response to vehicle speed and vehicle yaw rate error. The vehicle system includes where the speed control mode is a closed-loop speed control mode where a rotational speed of the first axle is subtracted from a requested speed of the first axle. The vehicle system further comprises additional instructions to operate the first electric machine or the second electric machine in the speed control mode in response to a vehicle yaw rate error. The vehicle system further comprises additional instructions to operate the first electric machine or the second electric machine in the speed control mode in response to an indication of a split coefficient of friction. The vehicle system further comprises additional instructions to blend a torque command of the first electric machine based on a torque in the first torque control mode and a torque in the speed control mode.

Figure 2:
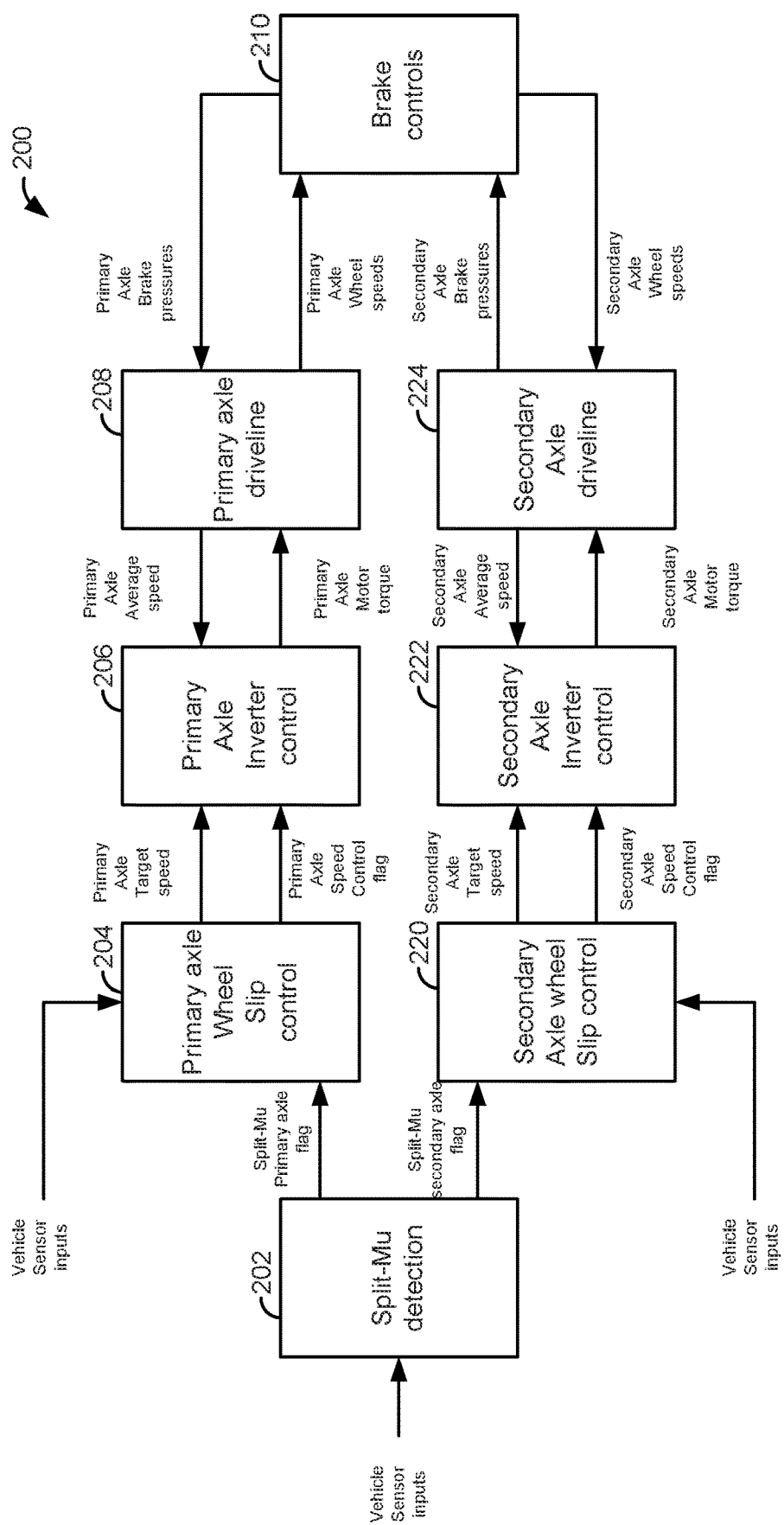
FIGS. 2-12 show block diagrams of an example method for controlling vehicle wheel slip.

Referring now to FIG. 2, a high level block diagram of a method for controlling wheel slip is shown. The method may be divided into four fundamental functions: Split-Mu detection (e.g., detection of a split coefficient of friction between left and right wheels for primary and secondary axles), primary axle wheel slip control, secondary axle slip control, and inverter controls. FIG. 2 provides a visual reference as to how each of these fundamental functions operates and communicates with other fundamental functions including control of friction brakes.

The split-Mu detection block 202 receives input from vehicle sensors including but not limited to vehicle yaw rate error, a vehicle speed estimate, each wheel speed, vehicle longitudinal acceleration, vehicle lateral acceleration, driver demand wheel torque, and friction braking torques. Split-Mu detection block 202 outputs a primary axle split-Mu flag and a secondary axle split-Mu flag. Flags as used in this description for split-Mu and other conditions or states are variables that are in controller memory and that represent the operating state of the condition being detected. The values or states of the flags may be Boolean true and false or they may be a logical one representing a true condition or a logical zero representing a false condition. For example, a secondary axle split-Mu flag state of true indicates that the secondary axle is operating on a road surface with two significantly different coefficients of friction (e.g., a first coefficient of friction at the left wheel of the secondary axle and a second coefficient of friction at the right wheel of the secondary axle). A secondary axle split-Mu flag state of false indicates that the secondary axle is operating on a road surface with only one detected coefficient of friction. Thus, split-Mu refers to one wheel of an axle in contact with a first surface having a first coefficient of friction and the other wheel of the axle in contact with a second surface having a second coefficient of friction, the first coefficient of friction different than the second coefficient of friction. Split-Mu detection block 202 outputs the primary axle split-Mu flag state to primary axle wheel slip control block 204. Split-Mu detection block 202 outputs the secondary axle split-Mu flag state to secondary axle wheel slip control block 220.

The primary axle wheel slip control block 204 and the secondary axle wheel slip control block 220 receive input from vehicle sensors and inputs including but not limited to secondary axle rotational speed, vehicle yaw rate error, a vehicle speed estimate, each wheel speed, steering wheel angle, accelerator pedal position, vehicle longitudinal acceleration, vehicle lateral acceleration, driver demand wheel torque, primary axle actual torque, the primary axle split-Mu flag, and primary axle torque mode torque request. The primary axle wheel slip control outputs a primary axle requested or target wheel speed and a primary axle speed control flag (e.g., a value of a variable that indicates the requested operating mode for the primary axle) to block 206. The primary axle speed control flag may be a state of true for operating the primary axle in a speed control mode (e.g., torque output of the primary axle electric machine is adjusted so that a rotational speed of the primary axle electric machine follows a requested or target speed). The primary axle speed control flag may be a state of false for operating the primary axle in a torque control mode (e.g., rotational speed of the primary axle electric machine is adjusted so that a torque of the primary axle electric machine follows a requested or target torque).

The primary axle wheel slip control block 204 detects when a significant wheel slip event occurs and it actively controls the wheel slip at the primary axle. This function uses the above mentioned vehicle data and measurements to detect a wheel slip event and to determine the optimal slip target to maximize the traction of the primary axle. The state of the primary axle speed control flag determines when the primary axle inverter controls should perform closed loop feedback speed control to track the primary axle speed target.

The secondary axle wheel slip control block 220 performs the same functions, but the inputs to the secondary axle wheel slip control block 220 are secondary axle rotational speed, vehicle yaw rate error, a vehicle speed estimate, each wheel speed, steering wheel angle, accelerator pedal position, vehicle longitudinal acceleration, vehicle lateral acceleration, driver demand wheel torque, secondary axle actual torque, the secondary axle split-Mu flag, and secondary axle torque mode torque request. The secondary axle wheel slip control outputs a secondary axle requested or target wheel speed and a secondary axle speed control flag to block 222. The secondary axle speed control flag indicates that secondary axle speed control mode is activated when the secondary axle speed control flag is true or equal to a value of one. Secondary axle speed control is not activated when the secondary speed control flag value is false.

Primary axle inverter control is included in block 206. The primary axle inverter control block 206 receives a primary axle requested or target speed and a primary axle speed control flag from the primary axle wheel slip control block 204. The primary axle inverter control block 206 also receives an average rotational speed of the primary axle from the primary axle driveline block 208. Primary axle inverter control block 206 outputs a primary axle motor torque to the primary axle driveline block 208. For axle configurations where the primary axle includes an open differential to deliver the driveline torque to the wheels, the primary axle speed control functions may only control the average wheel slip of the primary axle. In other words, the electrified driveline can only control the average primary axle wheel speed.

The secondary axle inverter control is included in block 222. The secondary axle inverter control operates similarly to the primary axle inverter control block 206. However, the secondary axle inverter control block 222 receives a secondary axle requested or target speed and a secondary axle speed control flag from the secondary axle wheel slip control block 220. Further, the secondary axle inverter control block 22 receives an average rotational speed of the secondary axle from the secondary axle driveline block 224. In addition, secondary axle inverter control block 222 outputs a secondary axle motor torque to the secondary axle driveline block 224.

Block 208 represents a primary axle driveline and it receives a primary motor torque command from block 206. The primary axle driveline also provides an average rotational speed of the primary axle to the primary axle inverter control block 206. The primary axle driveline outputs left and right wheel speeds to friction brake controller 210. The primary axle receives brake pressure adjustments from brake controls 210.

Block 224 represents a secondary axle driveline and it receives a secondary motor torque command from block 222. The secondary axle driveline also provides an average rotational speed of the secondary axle to the secondary axle inverter control block 222. The secondary axle driveline outputs left and right wheel speeds to friction brake controller 210. The secondary axle receives brake pressure adjustments from brake controls 210.

Friction brake controls 210 may reside is controller 115 of FIG. 1 and the controls 210 may adjust a braking force that is applied to left and right wheels of the primary axle and the secondary axle via adjusting pressure of brake fluid that is supplied to friction brakes of the primary axle and friction brakes of the secondary axle.

Figure 3:
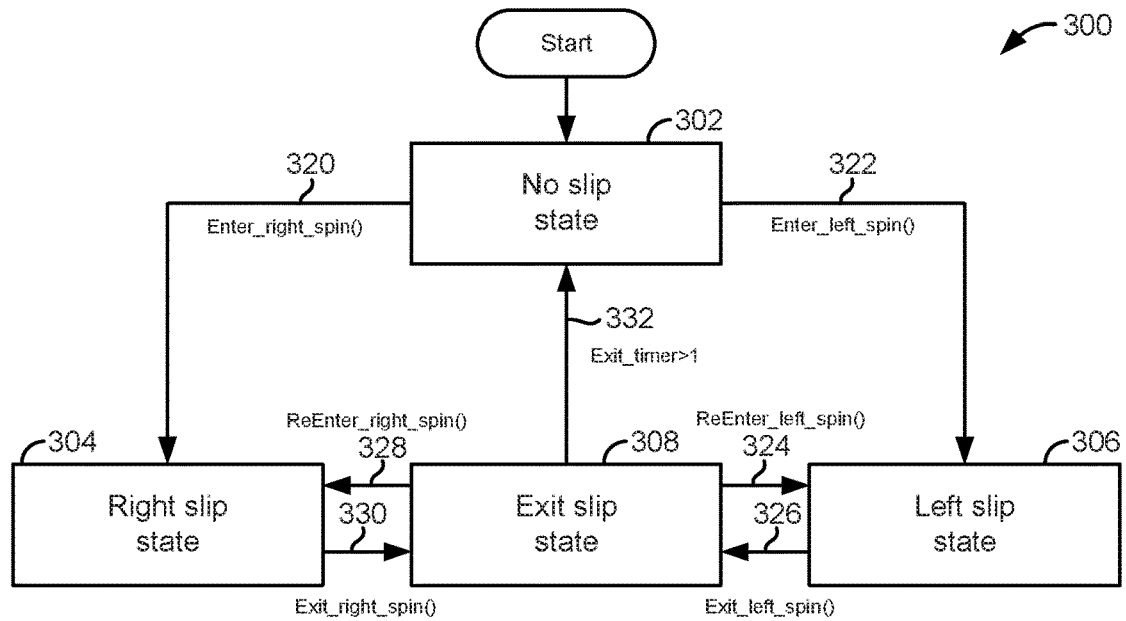

Referring now to FIG. 3, a state machine for detecting a split-Mu road condition and controlling wheel slip is shown. State machine 300 includes four states: No slip, right slip, left slip, and exit slip.

The Split-Mu Detection Function is responsible for determining when an axle is operating on a split-mu surface (e.g., a surface where there is a difference in coefficients of friction between the axle's left wheel and the axle's right wheel). The wheel slip controls use this information in order to adjust the target wheel slip to maximize traction on the axle. The state machine diagram given in FIG. 3 describes how the split-Mu detection logic functions for the primary axle and the secondary axle.

When there is no wheel slip, the state machine resides in the no slip state 302 setting the split-mu flag to zero indicating that there is no significant wheel slip difference across the axle. In other words, the active state of state machine 300 is 302 when wheel slip is not present. The primary and secondary axles operate in a torque control mode when no slip is indicated so that the combined output of the primary and secondary axles is equal to the driver demand torque. In particular, a driver demand torque may be determined from an accelerator pedal position and vehicle speed. A table or function of empirically determined values of driver demand torque is referenced via accelerator pedal position and vehicle speed. The table or function outputs the driver demand torque. Values in the table may be determined via operating the vehicle on a dynamometer and adjusting driver demand torque values until a desired vehicle response is achieved. The driver demand torque may be a torque that is delivered upstream of a gearbox and differential, or the driver demand torque may be a wheel torque, or a torque at another position in the driveline.

The drive demand torque is then distributed between vehicle propulsion sources such that each vehicle propulsion source provides some fraction of the driver demand torque. For example, if the driver demand torque is 200 Newton-meters (Nm) at the output of the torque sources and the torque distribution between a primary axle and a secondary axle is determined to be 50-50, and where the gear ratio between the primary axle electric machine and the primary axle wheels is equal to the gear ratio between the secondary axle electric machine and the secondary axle wheels, then the primary axle electric machine is requested to provide 100 Nm of torque and the secondary axle electric machine is requested to provide 100 Nm of torque. In another example, if the driver demand is 400 Nm at the vehicle's wheels and the torque distribution between the primary axle and the secondary axle is determined to be 50-50, and where the gear ratio between the primary axle electric machine and the primary axle wheels is equal to the gear ratio between the secondary axle electric machine and the secondary axle wheels, then the primary axle electric machine is requested to provide 200 Nm of torque at the wheels, for which the primary axle electric machine torque is adjusted according to the gear ratio between the primary axle electric machine and the axle, as well as the tire rolling radius. The secondary axle electric machine the is also requested to provide 200 Nm of torque at the wheels, for which the secondary axle electric machine torque is adjusted according to the gear ratio between the secondary axle electric machine and the axle, as well as the tire rolling radius.

In order to enter the left slip state 306 from no slip state 302 via link 322, the state machine 300 must satisfy the Enter_left_spin( ) function. The Enter_left_spin( ) function conditions may be met when the following conditions are met:

((left_split-Mu_flag==1) AND (split-Mu_inhibit_flag==1) AND (delta_slip_accel_flag==1) AND (delta_slip_flag==1) AND (veh_speed_inhibit_flag==1)) OR ((left_brake_split-Mu_flag==1) AND (veh_speed_inhibit_flag==1))

where AND is a Boolean and operator and, OR is a Boolean or operator, left_split-Mu_flag is a left wheel split-Mu flag, split-Mu_inhibit_flag is a split-Mu inhibit flag, delta_slip_accel_flag is a delta wheel slip acceleration flag, delta_slip_flag is a delta wheel slip flag, veh_speed_inhibit_flag is a variable that indicates if vehicle speed is less than a threshold speed (e.g., a speed above which split-Mu detection is not performed), left_brake_split-Mu_flag is a left friction brake split-Mu flag, and veh_speed_inhibit_flag is a vehicle speed inhibit flag.

Once the state machine enters the left slip state 306 and the left slip state 306 is active, the split-Mu flag is set to true or a value of one to indicate that the left wheel is on a low Mu surface and spinning faster than the right wheel. The state machine may exit the left slip state 306 via link 326 when conditions for the Exit_left_spin( ) function are met. The Exit_left_spin( ) function conditions may be met when the following conditions are met:

((left_slip<exit_slip_thresh) AND (brake_tq_inactive_flag==1)) OR ((axle_tq<exit_tq_thresh)

where left_slip is a left wheel slip amount, exit_slip_thresh is a wheel slip exit threshold amount, brake_tq_inactive_flag is a variable that is asserted or equal to a value of one when actual friction braking torque is less than a predetermined threshold and it may verify that no friction braking torque is being applied to the wheels, axle_tq is axle torque of the axle being evaluated, and exit_tq_thresh is an axle exit torque threshold. Once the Exit_left_spin( ) function is satisfied, the state machine enters the exit slip state 308 and the exit slip state is activated. The split-Mu flag is held at its previous value and a timer is activated. The state machine may re-enter the left slip state 306 via link 324 or enter the right slip state 304 via link 328 if the ReEnter_left_spin( ) function or ReEnter_right_spin( ) function is satisfied, whichever one is satisfied first controls the state. The ReEnter_left_spin( ) function conditions may be met if when the following conditions are met:

(reenter_right_split-Mu_flag) AND (Exit_timer<=1)

where reenter_right_split-Mu_flag is a reenter right wheel split-Mu flag, and Exit_timer is a value of an exit timer. The ReEnter_left_spin( ) function conditions may be met if when the following conditions are met:

(reenter_left_split-Mu_flag) AND
(Exit_timer<=exit_timer_thresh1)

where reenter_left_split-Mu_flag is a reenter left split-Mu flag, exit_timer_thresh is an adjustable threshold, and Exit_timer is a value of an exit timer. If neither function is satisfied by the time the exit timer (Exit_timer) reaches one second, the state machine will exit the Exit slip state 308 and enter the no slip state 302 via link 332. The split-Mu flag is reset to zero when the state machine enters the no slip state 302, thereby indicating that there is no split-mu surface active and the exit timer will be reset to zero.

In order to enter the right slip state 304 from no slip state 302 via link 320, the state machine 300 must satisfy the Enter_right_spin( ) function. The Enter_right_spin( ) function conditions may be met when the following conditions are met:

((right_split-Mu_flag==1) AND (split-Mu_inhibit_flag==1) AND (delta_slip_accel_flag==1) AND (delta_slip_flag==1) AND (veh_speed_inhibit_flag==1)) OR ((right_brake_split-Mu_flag==1) AND (veh_speed_inhibit_flag==1))

where right_split-Mu_flag is right split-Mu flag and right_brake_split-Mu_flag is right friction brake split-Mu flag. The other parameters have been described previously.

Once the state machine enters the right slip state 304 and the right slip state 304 is active, the split-Mu flag is set to true or a logical 1 to indicate that the right wheel is on a low Mu surface and spinning faster than the left wheel. The state machine may exit the right slip state 304 via link 330 when conditions for the Exit_right_spin( ) function are met. The Exit_right_spin( ) function conditions may be met when the following conditions are met:

((right_slip<exit_slip_thresh) AND (brake_tq_inactive_flag==1)) OR ((axle_tq<exit_tq_thresh)

where right_slip is right wheel slip amount and the other variables have been described previously. Once the Exit_right_spin( ) function is satisfied, the state machine enters the exit slip state 308 and the exit slip state is activated. The split-Mu flag is held at its previous value and a timer is activated. The state machine may re-enter the right wheel slip state 304 via link 328 or enter the left wheel slip state 306 via link 324 if the ReEnter_left_spin( ) function or ReEnter_right_spin( ) function is satisfied, whichever one is satisfied first controls the state.

If neither function is satisfied by the time the exit timer (Exit_timer) reaches one second, the state machine will exit the Exit slip state 308 and enter the no slip state 302 via link 332. The split-Mu flag is reset to false or a logical zero when the state machine enters the no slip state 302, thereby indicating that there is no split-Mu surface active and the exit timer will be reset to zero.

Figure 4:
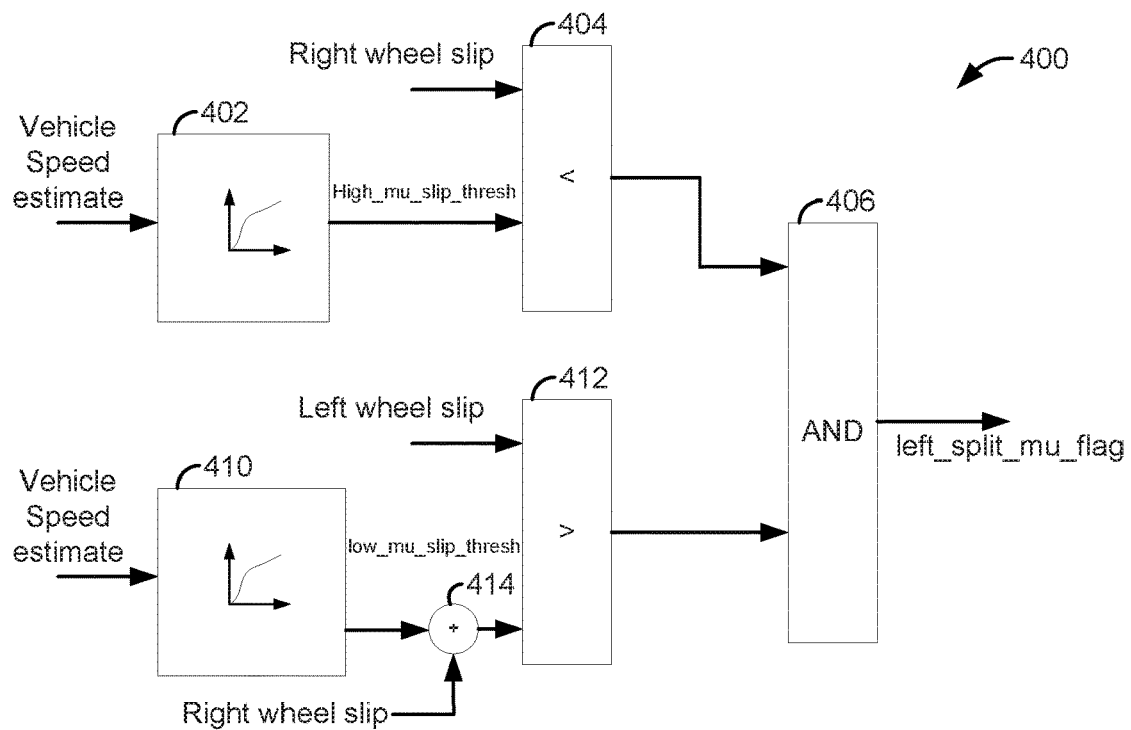

Referring now to FIG. 4, a block diagram that shows how a left split-Mu flag value is determined. A right split-Mu flag may be determined in a similar way, except the right wheel inputs shown in FIG. 4 are replaced with left wheel inputs and the left wheel inputs are replaced with right wheel inputs. For example, the right wheel slip input to block 404 is replaced with left wheel slip and the left wheel slip input to block 412 is replaced with right wheel slip to determine the right split-Mu flag.

A vehicle speed estimate is input to block 402 and block 402 outputs a high Mu slip threshold (high_mu_slip_thresh) that is based on the vehicle speed estimate. High Mu slip threshold values stored in block 402 may be empirically determined via operating the vehicle on a road or dynamometer and adjusting high Mu slip threshold values until a desired response is achieved. A right wheel slip amount for the axle is input to block 404 and block 404 judges if the right wheel slip amount is less than the high Mu slip threshold. If so, block 404 outputs true of a logical value of one. Otherwise, block 404 outputs false or a logical value zero.

A vehicle speed estimate is input to block 410 and block 410 outputs a low Mu slip threshold (low_mu_slip_thresh) that is based on the vehicle speed estimate. Low Mu slip threshold values stored in block 410 may be empirically determined via operating the vehicle on a road or dynamometer and adjusting low Mu slip threshold values until a desired response is achieved. The output of block 410 is input to summing junction 414 where it is added to the right wheel slip amount. A left wheel slip amount for the axle is input to block 412 and block 412 judges if the left wheel slip amount is greater than the low Mu slip threshold plus the right wheel slip. If so, block 412 outputs true or a logical value of one. Otherwise, block 412 outputs false or a logical value zero. A Boolean AND operation is performed on the output of blocks 404 and 412 at block 406. Block 406 outputs the left wheel split-Mu flag (left_split-Mu_flag). Similar logic outputs the right wheel split-Mu flag (right_split-Mu_flag).

Figure 5:
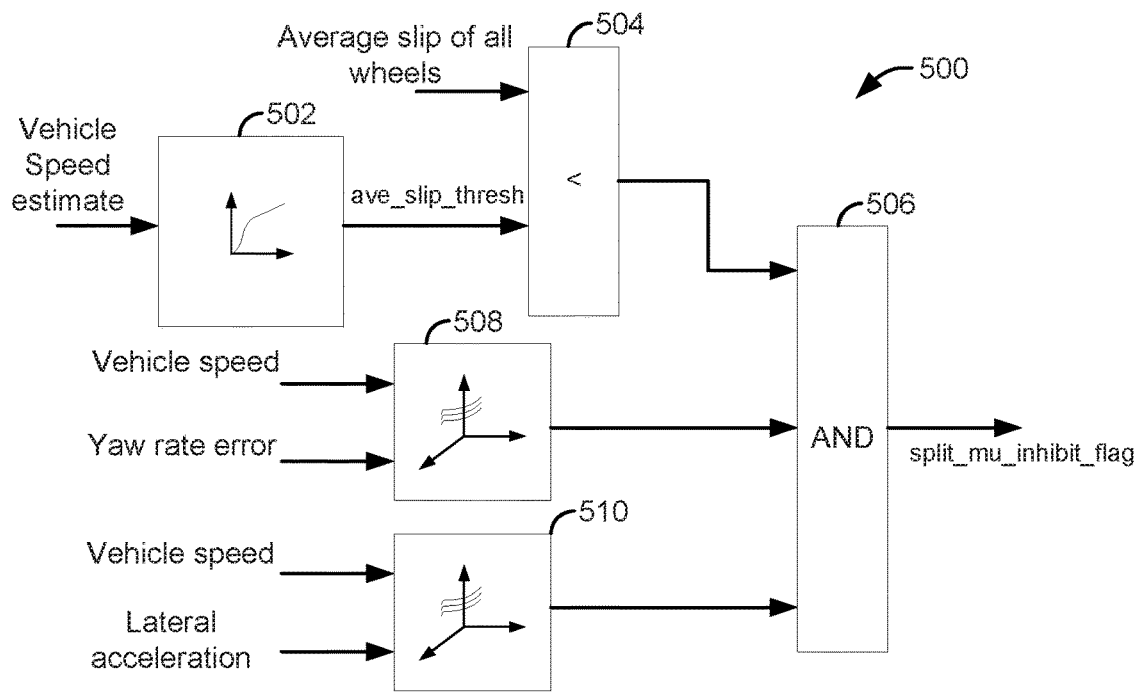

Referring now to FIG. 5, a block diagram 500 illustrating how a split-Mu inhibit flag state is determined is shown. The split-Mu inhibit flag (split-Mu_inhibit_flag) is intended to determine when the split-Mu detection logic may be active. The split-Mu inhibit flag only allows the split-Mu state machine in FIG. 3 to enter the left or right slip state if the average slip is below a predetermined threshold that may be calibrated, the yaw rate error is within a predetermined range, and the lateral acceleration is within a predetermined range. The logic is configured so that the split-Mu detection algorithm may not be allowed to trigger or activate during aggressive cornering (e.g., vehicle turning maneuvers) in order to avoid a larger change in driveline torque that may be due to a false positive split-Mu flag.

A vehicle speed estimate is input to block 502 and block 502 outputs an average wheel slip threshold (ave_slip_thresh). In block 502, the vehicle speed estimate indexes or references a function containing empirically determined average wheel slip threshold values. The function outputs a unique average wheel slip threshold value based on the present vehicle speed estimate. The present vehicle speed estimate may be based on one or more vehicle wheel speeds. The average wheel slip threshold value is input to block 504. The average wheel slip of all vehicle wheels is also input into block 504. Block 504 outputs true or a logical one value if the average wheel slip of all vehicle wheels is less than the average wheel slip threshold. Block 504 outputs false or a logical zero value if the average wheel slip of all vehicle wheels is not less than the average wheel slip threshold. The output of block 504 is input to block 506.

The vehicle speed estimate and vehicle yaw rate error are input to block 508. In block 508, the vehicle speed estimate and vehicle yaw rate error index or reference a function containing only values of logical one/true and logical zero/false. The function outputs a value of one or true when the vehicle yaw rate error is within a predetermined range. The predetermined range values may be empirically determined. The function outputs a value of zero or false when the vehicle yaw rate error is not within the predetermined range. The output of block 508 is input to block 506.

The vehicle speed estimate and vehicle lateral acceleration are input to block 510. In block 510, the vehicle speed estimate and vehicle lateral acceleration index or reference a function containing only values of logical one/true and logical zero/false. The function outputs a value of one or true when the vehicle lateral acceleration is within a predetermined range. The predetermined range values may be empirically determined. The function outputs a value of zero or false when the vehicle lateral acceleration is not within the predetermined range. The output of block 510 is input to block 506.

Block 506 performs a Boolean AND operation on the output of blocks 504, 508, and 510. Block 506 outputs true or a logical one if the average vehicle wheel slip is below a predetermined threshold that may be calibrated, the vehicle yaw rate error is within a predetermined range, and the vehicle lateral acceleration is within a predetermined range. Otherwise, block 506 outputs false or a logical zero. The output of block 506 is the split-Mu inhibit flag (split-Mu_inhibit_flag).

Figure 6:
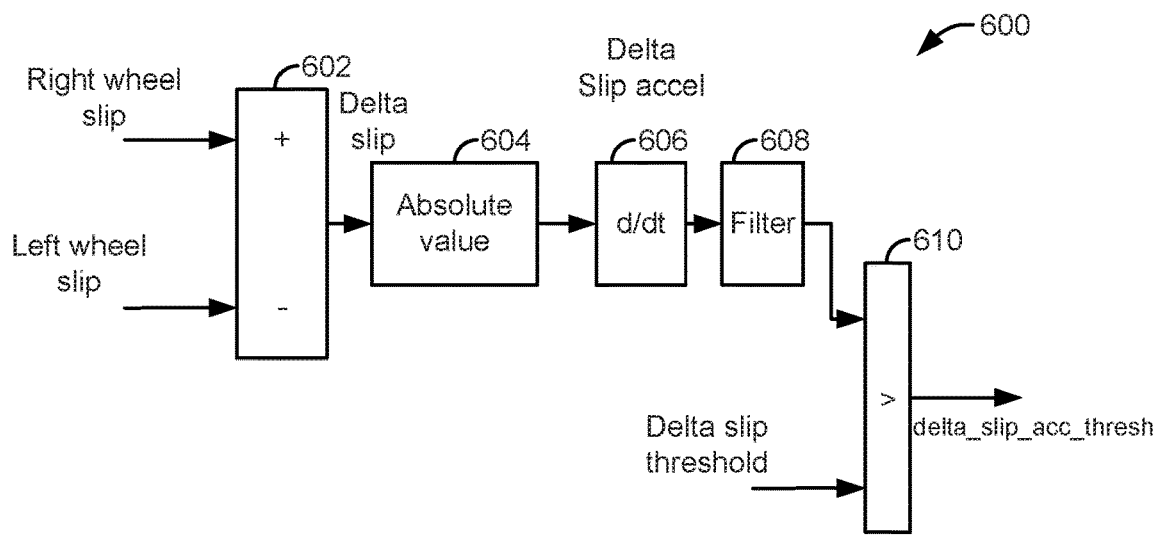

Referring now to FIG. 6, a block diagram 600 for determining a delta wheel slip acceleration threshold is shown. The delta wheel slip acceleration threshold (delta_slip_accel_thresh) is based on monitoring the delta wheel slip acceleration between the right and left wheel slip to determine if the axle is operating on a split-Mu surface. If one wheel is on a low Mu surface, the time rate of change of the wheel slip difference will increase much more quickly than if the both wheels slip at the same rate.

Right wheel slip and left wheel slip for an axle are input into block 602. Block 602 subtracts the left wheel slip from the right wheel slip and outputs the result to block 604. An absolute value of the output of block 602 is determined at block 604, and block 604 outputs the result to block 606. Block 606 determines a derivative of the output of block 604 with respect to time. Block 606 outputs the derivative of the output of block 606 to block 608. Block 608 filters the output of block 606 and provides the result to block 610. In one example, block 608 applies a first order low pass filter to the output of block 606. Block 610 determines if the output of block 608, the filtered derivative of the absolute value of right wheel slip minus left wheel slip, is greater than a predetermined delta wheel slip threshold. If block 610 determines that the filtered derivative of the absolute value of right wheel slip minus left wheel slip is greater than the predetermined delta wheel slip threshold, block 610 outputs true or a value of one. Otherwise, block 610 outputs false or a value of zero. The output of block 610 is the delta wheel slip acceleration threshold (delta_slip_accel_thresh) flag.

Figure 7:
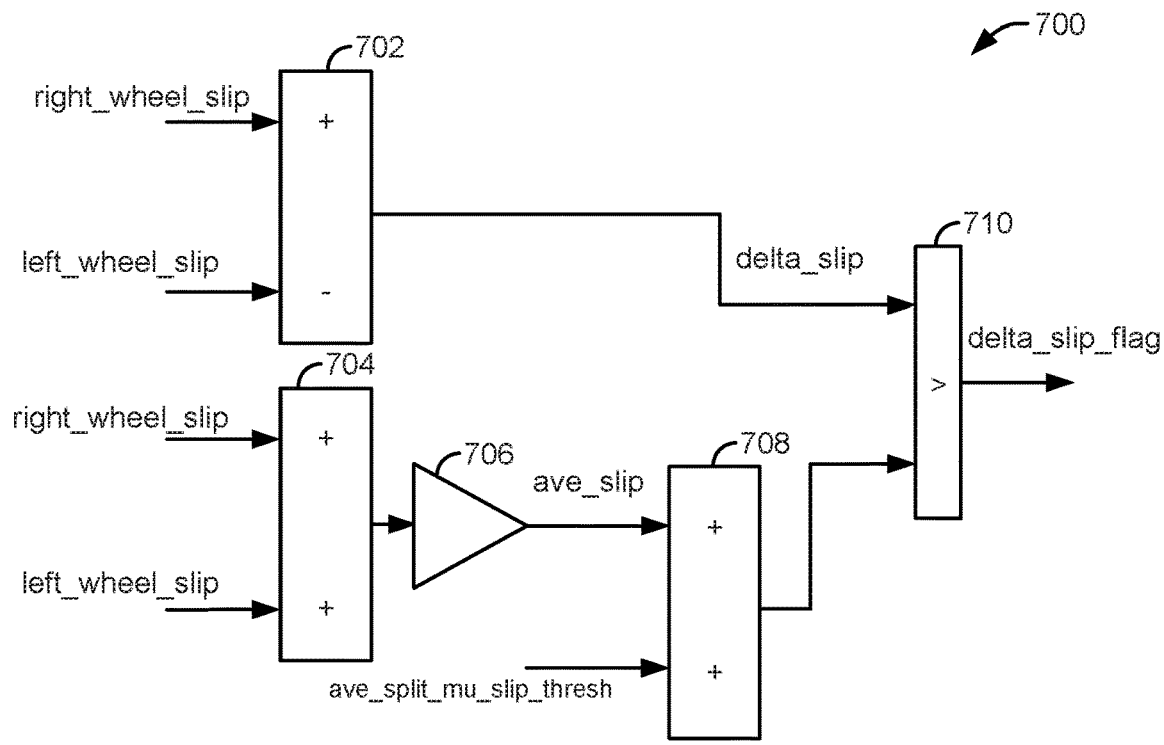

Referring now to FIG. 7, a block diagram 700 for determining a delta wheel slip flag is shown. The delta wheel slip flag (delta_slip_flag) is based on monitoring the average wheel slip and the wheel slip difference of the axle. If the wheel slip difference exceeds the average wheel slip of the axle, then this condition gives an indication that the axle is operating on a split-Mu surface. If both wheels are on the same road friction surface, then the wheel slip difference will be small compared to the average wheel slip of the axle.

Right wheel slip (right_wheel_slip) and left wheel slip (left_wheel_slip) for an axle are input into block 702. Block 702 subtracts the left wheel slip from the right wheel slip to determine a delta wheel slip (delta_slip) and outputs the result to block 710. Right wheel slip and left wheel slip for an axle are also input into block 704. Block 704 adds the left wheel slip to the right wheel slip and outputs the result to block 706. The output of block 706 is multiplied by 0.5 in block 706 to generate an average wheel slip value (ave_slip). The output of block 706 is input to block 708. Block 708 adds the average wheel slip output from block 706 and a predetermined average split-mu slip threshold (ave_split_mu_slip_thresh). The output of block 708 is input to block 710. Block 710 determines if the delta wheel slip that is output from block 702 is greater than the output of block 708. If the delta wheel slip that is output from block 702 is greater than the output of block 708, then block 710 outputs true of a logical one to indicate that delta wheel slip flag (delta_slip_flag) is asserted. Otherwise, block 710 outputs false or a logical zero to indicate that the delta wheel slip flag is not asserted.

Figure 8:
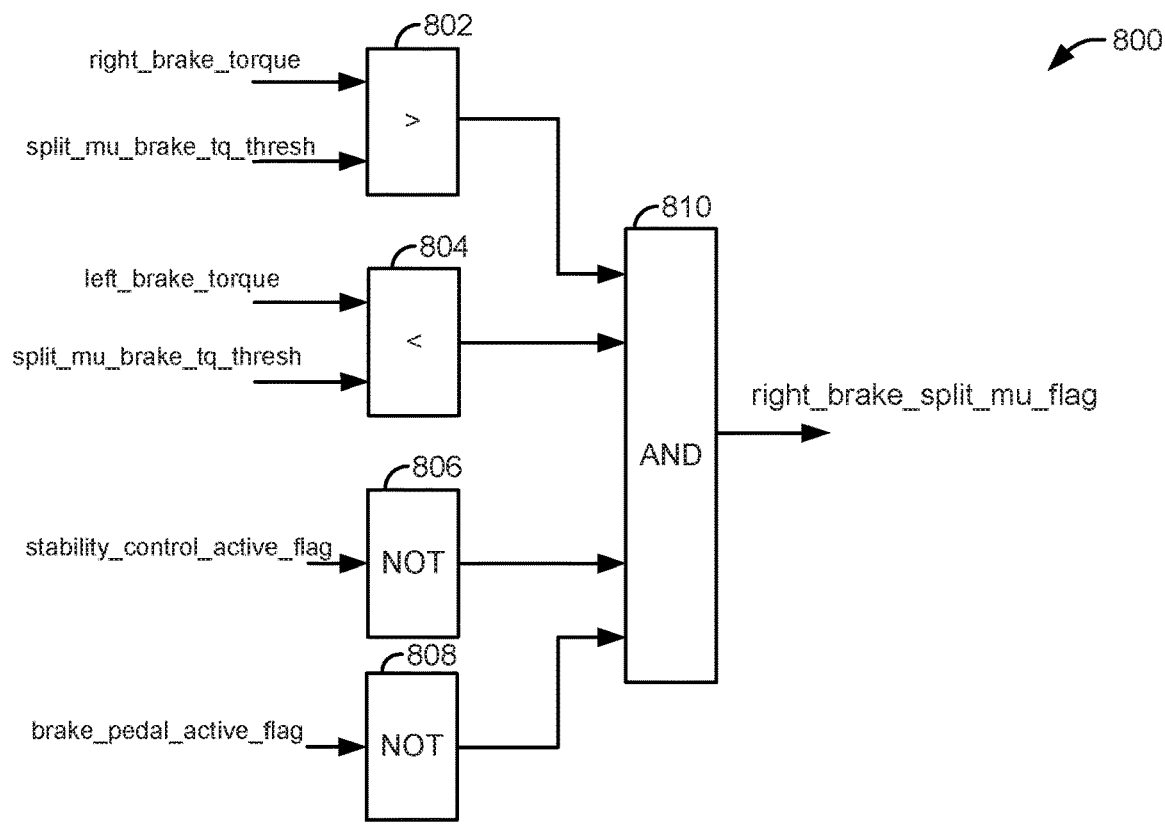

Referring now to FIG. 8, a block diagram 800 for determining a right brake split-Mu flag (right_brake_split-Mu_flag) is shown. The left brake split-Mu flag (left_brake_split-Mu_flag) may be determined in a similar way, except the left brake torque input is exchanged for a right brake torque input and the right brake torque input is exchanged for a left brake torque input. The left_brake_split-Mu_flag and right_brake_split-Mu_flag are designed to trigger the split-Mu detection spin states if the brake system is actively braking one wheel and the driver is not applying the brake pedal. In order to prevent intervention during an electronic stability control ESC event, the stability_control_active_flag must be false indicating that the vehicle is not in a stability event.

Braking torque of the axle's right friction brake (right brake torque) is input to block 802 along with the split-Mu brake torque threshold (split-Mu_brake_tq_thresh). The split-Mu brake torque threshold may be empirically determined via testing the vehicle on different surfaces to determine the friction braking torque needed to bias torque to the high Mu wheel. Block 802 outputs true or a logical one if the braking torque of the axle's right friction brake is greater than the split-Mu brake torque threshold. Otherwise, block 802 outputs false or a logical zero. The output of block 802 is input to block 810.

Braking torque of the axle's left friction brake (left_brake_torque) is input to block 804 along with the split-Mu brake torque threshold (split-Mu_brake_tq_thresh). Block 804 outputs true or a logical one if the braking torque of the axle's left friction brake is less than the split-Mu brake torque threshold. Otherwise, block 804 outputs false or a logical zero. The output of block 804 is input to block 810.

The stability control system active flag that indicates whether or not the stability control system is presently activated and taking action to maintain vehicle stability (e.g., automatically applying vehicle brakes). The stability control system active flag takes on a value of one or true when the stability control system is activated and taking action to maintain vehicle stability. The stability control system active flag takes on a value of zero or false when the stability control system is not activated and not taking action to maintain vehicle stability. The stability control system flag is input to block 806. Block 806 performs a Boolean NOT operation on the stability control system flag. Thus, if the stability control system flag is asserted, block 806 outputs false or a logical zero. The output of block 806 is input to block 810.

The stability brake pedal active flag that indicates whether or not the brake pedal is presently activated or applied. The brake pedal active flag takes on a value of one or true when the brake pedal is applied. The brake pedal active flag takes on a value of zero or false when the brake pedal system is not applied. The brake pedal active flag is input to block 808. Block 808 performs a Boolean NOT operation on the brake pedal active flag. Thus, if the brake pedal active flag is asserted, block 808 outputs false or a logical zero. The output of block 808 is input to block 810.

At block 810, a Boolean AND operation is performed on the output of blocks 802, 804, 806, and 808. Block 810 outputs a right brake split-Mu flag (right_brake_split_mu_flag).

Figure 9:
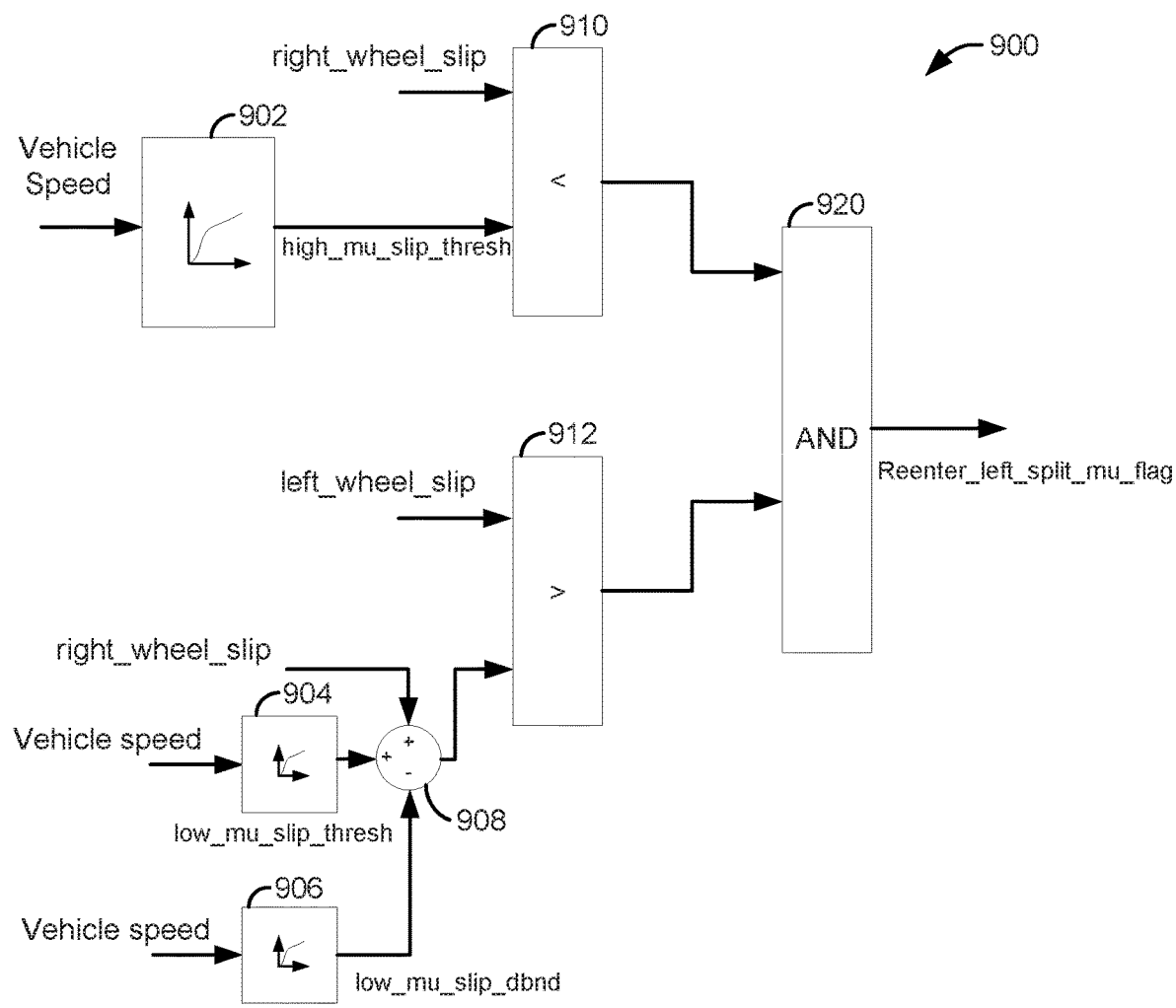

Referring now to FIG. 9, a block diagram 900 for determining when to reenter a left wheel spin states of state diagram 300 is shown. Reentry into the right wheel spin state of diagram 300 may be determined in a similar way, except the left wheel slip input is exchanged for a right wheel slip input and the right wheel slip input is exchanged for a left wheel slip input. The reenter left split-Mu flag (reenter_left_split_mu_flag) will be asserted as a value of one or true if the wheel slip of the right wheel remains below a predetermined threshold (high_mu_slip_thresh) and the wheel slip of the left wheel is greater than the summation of the right wheel slip predetermined threshold (low_mu_slip_thresh) and a predetermined deadband (low_mu_slip_dbnd). The two wheel slip thresholds and the deadband threshold may be obtained from lookup tables in controller memory that are a function of the vehicle speed estimate. The purpose of these flags is to compare the wheel slip between the left and right wheels. If the wheel slip of one wheel is significantly greater than the other, it gives an indication that the tires are operating on a split-Mu surface. The deadband lowers the wheel slip threshold required to re-enter the left wheel spin state of state diagram 300. The reenter right split-Mu flag (reenter_right_split_mu_flag) works in the same manner.

The vehicle speed estimate is input to block 902 and block 902 returns a high Mu slip threshold (high_mu_slip_thresh). In block 902, the vehicle speed estimate indexes or references a function containing empirically determined high Mu wheel slip threshold values. The function outputs a unique high Mu wheel slip threshold value based on the present vehicle speed estimate. The high Mu wheel slip threshold is input to block 910. The right wheel slip is also input into block 910. Block 910 outputs true or a logical one value if the right wheel slip is less than the high Mu wheel slip threshold. Block 910 outputs false or a logical zero value if the right wheel slip is not less than the high Mu wheel slip threshold. The output of block 910 is input to block 920.

The vehicle speed estimate is input to block 904 and block 904 returns a low Mu slip threshold (low_mu_slip_thresh). In block 904, the vehicle speed estimate indexes or references a function containing empirically determined low Mu wheel slip threshold values. The function outputs a unique low Mu wheel slip threshold value based on the present vehicle speed estimate. The low Mu wheel slip threshold is input to summing junction block 908.

The vehicle speed estimate is also input to block 906 and block 906 returns a low Mu slip deadband value (low_mu_slip_dbnd). In block 906, the vehicle speed estimate indexes or references a function containing empirically determined low Mu wheel slip deadband values. The function outputs a unique low Mu wheel slip deadband value based on the present vehicle speed estimate. The low Mu wheel slip deadband value is input to summing junction block 908. An amount of right wheel slip is also input to summing junction 908.

At summing junction 908, the low Mu slip deadband amount is subtracted from the right wheel slip amount that is added to the low Mu slip threshold amount. The output of summing junction 908 is input to block 912. Block 912 outputs true or a logical one value if the left wheel slip amount is greater than the output of summing junction 908. Block 912 outputs false or a logical zero value if the left wheel slip amount is not less than the output of summing junction 908. The output of block 912 is input to block 920. A Boolean AND operation is performed on the output of block 910 and the output of block 912. The output of block 920 is the reenter left split-Mu flag (reenter_left_split_mu_flag).

Figure 10:
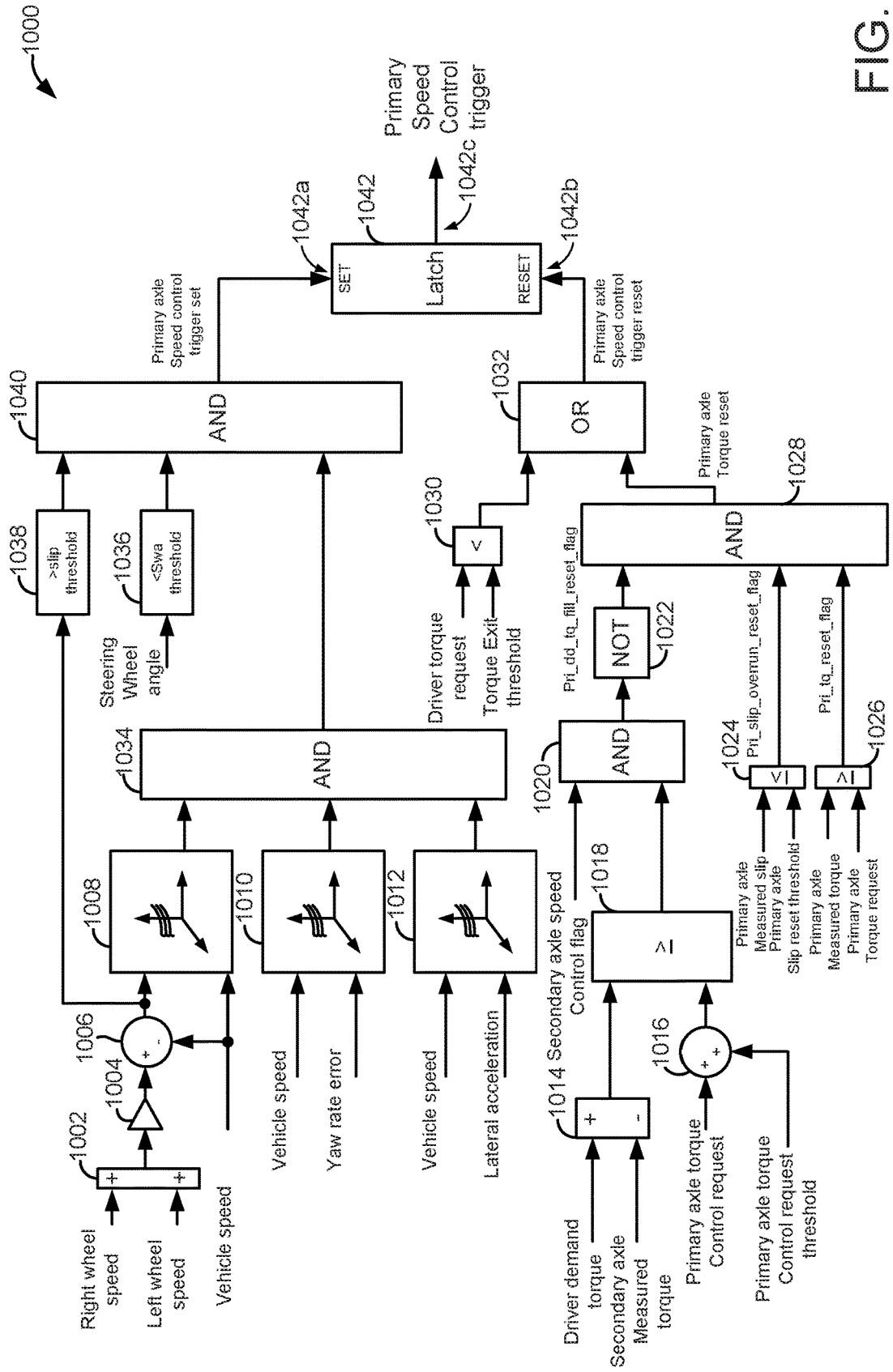

Referring now to FIG. 10, a block diagram 1000 for determining when to operate the primary axle in a speed control mode to control wheel slip is shown. The method described via block diagram 1000 and the other block diagrams described herein may be applied to the primary and the secondary axle. Primary axle wheel signals (e.g., wheel slip, wheel speed, etc.) are applied to the methods described via the block diagrams when the block diagrams are applied to the primary axle. Secondary axle signals are applied to the methods described via the block diagrams when the block diagrams are applied to the secondary axle. The description of FIG. 10 is limited to the primary axle for simplicity of understanding.

The primary axle slip control logic for determining when to enter the primary axle into a speed control mode is shown. The output of this block diagram 1000 is a variable with a logical value (e.g., Boolean flag where a value of one indicates true and a value of zero represents false) indicating when to activate wheel slip control on the primary axle and operate the primary axle in a speed control mode. The primary axle may operate in a torque control mode prior to entering the speed control mode and wheel slip control. The output of block diagram 1000 is a primary axle speed control trigger that is determined via a latch function 1042.

The latch function 1042 has a set input 1042a and a reset input 1042b. The output 1042c of the latch is true or a logical one whenever the set input 1042a is true or a logical one. The output 1042c of the latch is set to true whenever the set input 1042a is true or equal to one. Once the latch 1042 is set to true, the latch output 1042c will hold the true state until the reset input 1042b is set to true. The latch output 1042c changes to false or zero when the reset input 1042a to the latch is true. The output 1042c of the latch will always be false as long as the reset input 1042b is true regardless of the state of the set input 1042a. As can be seen from the block diagram 1000, the set input 1042a is used to determine when to turn on slip control on the primary axle whereas the reset input 1042b is used to determine when to turn it off. Wheel slip control is activated when three criteria are simultaneously met: the measured wheel slip exceeds a predetermined threshold, the measured steering wheel angle is below a predetermined threshold, and the vehicle state modifier is set to true. The vehicle state modifier monitors the vehicle speed, yaw rate error and lateral acceleration. The purpose of the vehicle state modifier is to inhibit wheel slip control during certain vehicle operating ranges such as during hard cornering at high speed among other operating states. Wheel slip control on the primary axle is reset or inhibited when two criteria are met: the driver requested torque falls below a predetermined threshold or the axle torque reset flag is true. The driver requested torque is used to turn off or inhibit slip control when the human driver lifts off the accelerator pedal or when the driver requested torque is below certain a level of torque demand. The driver requested torque being less than a threshold will naturally decrease the wheel slip of the primary axle. The primary axle torque reset flag (output of block 1032) is triggered when the following three flags are simultaneously true: Pri_dd_tq_fill_reset_flag, Pri_slip_overrun_reset_flag, and Pri_tq_reset_flag.

The Pri_dd_tq_fill_reset_flag is used to inhibit a primary axle slip control reset if the secondary axle is in speed control mode and the difference between the driver torque request and the delivered secondary axle torque is greater than the primary axle torque control torque request plus a predetermined threshold. During normal operation (e.g., when wheel slip control is not being used) the vehicle controller may split the driver requested torque between the primary axle and the secondary axle using torque control; a percentage of the driver requested torque is requested to be provided via the primary axle electric machine and the remaining torque is requested to be provided via the secondary axle electric machine. In this way, the vehicle controller may meet the driver requested torque. However, when wheel slip control is applied, a closed loop speed controller takes over the primary axle in order to control to a target or requested wheel speed. The speed controller adjusts electric machine torque so that primary axle wheel speed follows a requested speed. During a traction event where wheel slip is detected, the closed loop speed control mode torque will always be smaller than the torque mode torque on an axle immediately before entry into the closed loop speed control mode in order to control wheel slip. However, since each axle is independent this creates a possibility of one axle operating in torque control mode and the other axle operating in a speed control mode. If this happens, the axle operating in torque control mode delivers its torque mode torque and the portion of driver demand torque that is not being delivered by the axle that is operating in speed control mode so that the driver requested torque may be provided. For example, if the driver demand torque is 200 Nm at the electric machine outputs and 150 Nm has been assigned to be delivered via the primary axle electric machine and 50 Nm has been assigned to be delivered via the secondary axle electric machine when the front and rear axles are operating in torque control mode, but wheel slip occurs at the secondary axle so that only 10 Nm is delivered by the secondary axle electric machine operating in speed control mode, then the primary axle electric machine torque is adjusted to 190 Nm to meet driver demand torque.

In block diagram 1000, the difference between the driver requested torque and the torque that is delivered via the secondary axle is the torque that the primary axle delivers in order to meet driver demand. If the secondary axle is in speed control mode, the torque that is delivered via the secondary axle may be the secondary axle speed control mode torque. If the difference between these two signals is greater than the primary axle torque mode torque request, the logic prevents the primary axle from exiting slip control. The reason for this is that if the primary axle were to exit slip control during this time, it may deliver more torque that is desired in order to meet the driver requested torque. This may cause a larger wheel slip overrun on the primary axle.

The pri_slip_overrun_reset_flag prevents the method from exiting speed control mode unless the measured primary axle slip is below a predetermined threshold. Finally, the pri_tq_reset_flag is used to exit wheel slip control if the speed mode torque is greater than the torque mode torque request. The output of the primary axle slip control trigger sub function is the Boolean flag primary axle speed control trigger. The output is sent to the primary axle inverter controls where the closed loop torque and speed controllers are located.

Right wheel speed and left wheel speed are input to block 1002 where the right wheel speed and left wheels speed are added together. Block 1002 outputs the sum of right wheel speed and left wheel speed to block 1004. Block 1004 multiplies the sum of right wheel speed and left wheel speed by a value of 0.5 to generate an average wheel speed. The average wheel speed is input to summing junction 1006. Vehicle speed is also input to summing junction 1006. The vehicle speed is subtracted from the average wheel speed at summing junction 1006 and summing junction 1006 outputs a wheel slip amount to block 1038 and block 1008.

In block 1008, the wheel slip amount and the vehicle speed estimate index or reference a function containing only values of one and zero, or alternatively, true and false. The function outputs a value of one or true when the wheel slip is within a predetermined range. The predetermined range values may be empirically determined. The function outputs a value of zero or false when the wheel slip error is not within the predetermined range. The output of block 1008 is input to block 1034.

The vehicle speed estimate and yaw rate error are input to block 1010. The vehicle speed estimate and vehicle yaw rate error index or reference a function containing only values of one or true and zero or false. The function outputs a value of one or true when the vehicle yaw rate error is within a predetermined range. The predetermined range values may be empirically determined. The function outputs a value of zero or false when the vehicle yaw rate error is not within the predetermined range. The output of block 1010 is input to block 1034.

The vehicle speed estimate and lateral acceleration are input to block 1012. The vehicle speed estimate and vehicle lateral acceleration index or reference a function containing only values of one or true and zero or false. The function outputs a value of one or true when the vehicle lateral acceleration is within a predetermined range. The predetermined range values may be empirically determined. The function outputs a value of zero or false when the vehicle lateral acceleration is not within the predetermined range. The output of block 1012 is input to block 1034.

Block 1034 performs a Boolean AND operation on the outputs of blocks 1008, 1010, and 1012. Thus, if all of blocks 1008, 1010, and 1012 output a value one or true, the output of block 1034 is a logical one or true. Otherwise, the output of block 1034 is a logical zero or false. The output of block 1034 is input to block 1040.

Block 1038 receives the output of summing junction 1006 (wheel slip amount) and block 1038 outputs a logical one or true value if the wheel slip amount is greater than a threshold wheel slip amount. Otherwise, block 1038 outputs a logical zero or false. The output of block 1038 is input to block 1040.

Block 1036 receives input from steering angle sensor 151 (shown in FIG. 1) and block 1036 outputs a logical one or true value if the steering wheel angle is less than a threshold steering wheel angle. Otherwise, block 1036 outputs a logical zero or false. The output of block 1036 is input to block 1040.

Block 1040 performs a Boolean AND operation on the outputs of blocks 1038, 1036, and 1034. Thus, if all of blocks 1038, 1036, and 1034 output a value one or true, the output of block 1040 is a logical one or true. Otherwise, the output of block 1040 is a logical zero or false. The output of block 1040 is input to the set input of block 1042 (the latching function).

Driver demand torque and secondary axle measured torque are input to block 1014. The secondary axle measured torque is subtracted from the driver demand torque in block 1014 and block 1014 outputs the result to block 1018. The result is an amount of additional torque that the primary axle may output to meet the driver demand torque.

The primary axle torque request and the primary axle torque control request threshold are input to summing junction 1016. Summing junction 1016 adds the primary axle torque control request and the primary axle torque control threshold. The result of adding the primary axle torque control request and the primary axle torque control threshold is output to block 1018.

Block 1018 determines if the output of block 1014 is greater than or equal to the output of summing junction 1016. If so, block 1014 outputs a logical one or true. Otherwise, block 1014 outputs a logical zero or false. The output of block 1014 is input to block 1020.

The secondary axle speed control trigger flag is input to block 1020 and the secondary axle speed control trigger flag is output from a latch function similar to 1042. Block 1018 performs a Boolean AND operation on the secondary axle speed control trigger flag and the output of block 1018. Thus, if both of the output of block 1018 and the secondary axle speed control trigger flag are true or a value of one, then block 1020 outputs a value of one or true. Otherwise, block 1020 outputs a value of zero or false. The output of block 1020 is input to block 1022, and block 1022 performs a Boolean NOT operation on the output of block 1020. Block 1022 outputs the result of the Boolean NOT operation to block 1028.

Block 1024 determines if the primary axle measured wheel slip is less than or equal to the primary axle wheel slip reset threshold. If so, block 1024 outputs a logical one or true. Otherwise, block 1024 outputs a logical zero or false. The output of block 1024 is input to block 1028. The primary axle wheel slip reset threshold may be empirically determined via testing the vehicle on different surfaces and determining desired slip values which the slip controller can exit without causing another wheel speed change.

Block 1026 compares the measured primary axle torque to the primary axle torque mode torque request. When speed control is active, the measured primary axle torque is the speed control torque. Block 1026 forces speed control to exit whenever the speed control torque exceeds the torque control torque.

Block 1028 performs a Boolean AND operation on the outputs of blocks 1022, 1024, and 1026. Thus, if all of the outputs of blocks 1022, 1024, and 1026 are true or a value of one, then block 1028 outputs a value of one or true. Otherwise, block 1028 outputs a value of zero or false. The output of block 1028 is input to block 1032.

Block 1030 determines if the driver demand torque request is less than a torque exit threshold. If so, block 1030 outputs a logical one or true. Otherwise, block 1030 outputs a logical zero or false. The output of block 1030 is input to block 1032. The torque exit threshold may be empirically determined via adjusting the threshold until the transition from speed control mode to torque control mode is smooth on all surfaces when the driver releases the accelerator pedal, thereby reducing the driver demand torque.

Block 1032 performs a Boolean OR operation on the outputs of blocks 1030 and 1028. Thus, if either of the outputs of blocks 1030 and 1028 are true or a value of one, then block 1032 outputs a value of one or true. Otherwise, block 1032 outputs a value of zero or false. The output of block 1032 is input to the reset of block 1042.

Block 1042 performs the latch function previously described. In particular, if the input to set input 1042a is a logical one or true and the input to reset input 1042b is a logical zero or false, the output 1042b of block 1042 is held to a logical one or true as long as the reset input 1042b does not receive a logical one or true input. If reset input 1042b does receive a logical level one or true, then output 1042b of block 1042 changes to a logical zero or false until the reset input 1042b receives a logical zero or false and the set input 1042a receives a logical one or true level. The output of block 1042 is a primary axle speed control trigger flag.

Figure 11:
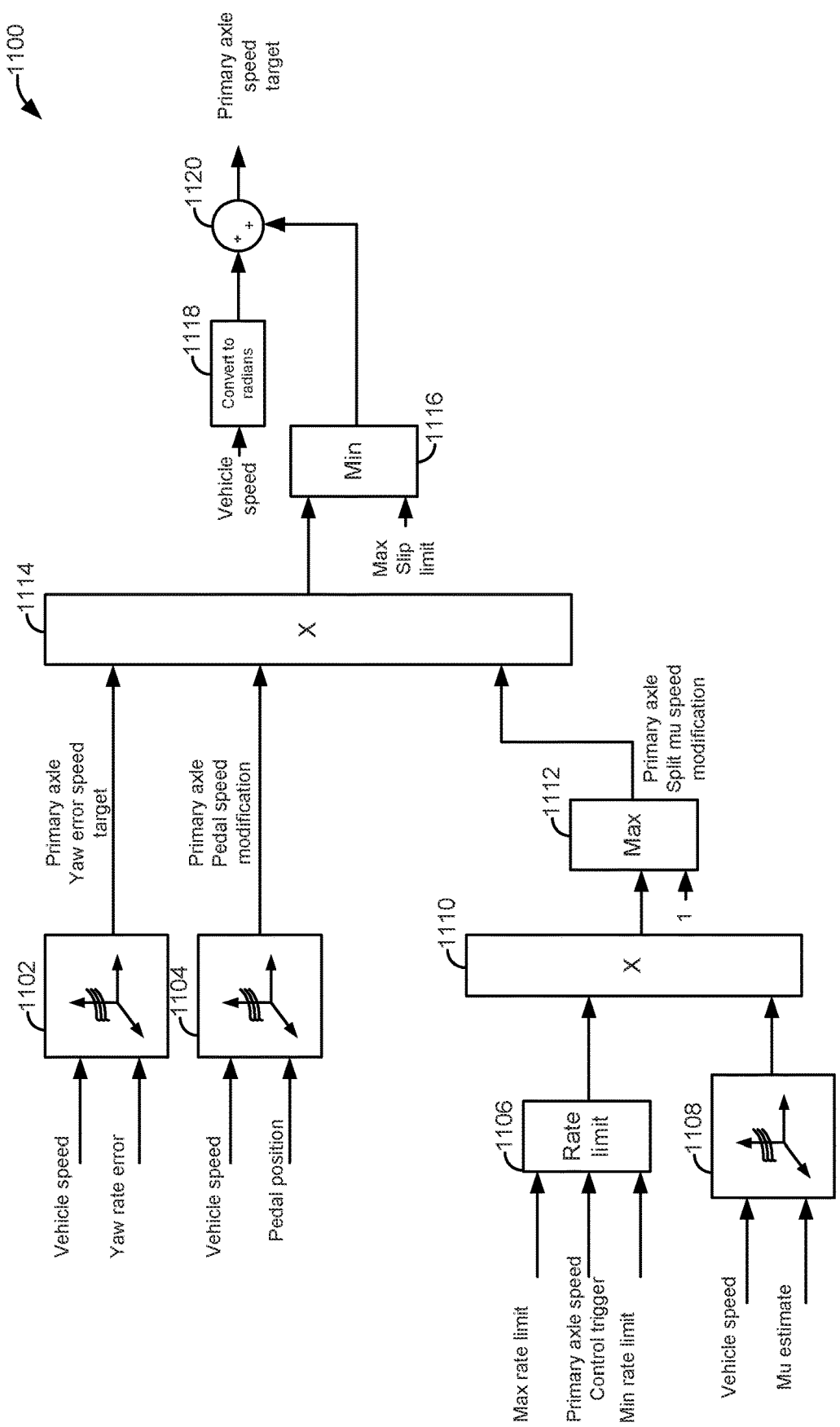

Referring now to FIG. 11, a block diagram for determining a wheel slip target or requested axle speed is shown. The wheel slip target or request generator sub function is responsible for determining the wheel slip target or request speed to maximize traction during slip control. The wheel slip target or request is realized by determining a wheel speed target or request for the primary axle. The primary axle wheel speed target or request is calculated by converting the estimated vehicle speed estimate to rad/s in the wheel domain and adding the desired wheel slip target or request. The resulting wheel speed target or request will deliver the desired wheel slip target or request when the closed loop speed controller is activated in the inverter controls. The primary axle wheel slip target or request is determined by a feedforward path with two modifiers. The base wheel slip target is determined via a lookup table that monitors the vehicle yaw rate error and vehicle speed. The wheel slip target or request is adjusted based on the vehicle yaw rate error in order to correct for oversteer and understeer while in wheel slip control. The first modifier monitors the accelerator pedal position and vehicle speed. The wheel slip target is adjusted to compensate for the driver's accelerator pedal input in order to give the driver the ability to adjust the wheel slip with the accelerator pedal position. The final modifier is based on the primary axle split-Mu flag. When the split-Mu flag is false, the modifier is set to one. This causes the modifier to act as a pass through since it does not have an effect on the slip target. However, when the split-Mu flag is set to true, the slip target is ramped up to a predetermined value that is based on vehicle speed and a surface Mu estimate. The concept is that during a split-Mu event (e.g., one wheel of a axle is on a lower friction surface while the other wheel is on a higher friction surface), the wheel slip target needs to be increased in order to increase the torque on the axle so that the braking system can bias the torque to the high Mu wheel via individual brake pressure actuation.

The vehicle speed estimate and vehicle yaw rate error are input to block 1102. In block 1102, the vehicle yaw rate error and the vehicle speed estimate index or reference a function that contains values of primary axle yaw based speed target or request values. There is a unique primary axle speed target or request value for each vehicle speed estimate and vehicle yaw rate error pair. The function outputs a value of the primary axle speed target or request to block 1114. The primary axle speed target or request values in the function may be empirically determined via inducing understeer/oversteer on different surfaces and adjusting values in a table so that the speed controller smoothly corrects for oversteer and understeer.

The vehicle speed estimate and accelerator pedal position are input to block 1104. In block 1104, the accelerator pedal position and the vehicle speed estimate index or reference a function that contains values of primary axle speed modification values. There is a unique primary axle speed modification target or request value for each accelerator pedal position and vehicle speed estimate pair. The function outputs a value of the primary axle speed modification target or request to block 1114. The primary axle speed modification target or request values in the function may be empirically determined via inducing a wheel slip event and modulating the wheel slip target in order to achieve a desirable response to the driver's pedal input (e.g., accelerator pedal input) while still retaining tight slip control of the wheels. The main idea behind this table is to avoid having a "dead pedal" feel where a pedal input doesn't translate to a direct vehicle response. This table gives the driver some control over the wheel slip in order to handle driving on sand or gravel.

A maximum axle speed rate limit, a minimum axle speed rate limit, and the primary axle split-Mu flag value are input to block 1106. Block 1106 outputs a modifier within the range of [0, 1]. The rate limit block is just a way to translate the "on/off" nature of the split-Mu flag into a smooth transition. This block provides a smooth increase/decrease of slip target when the split-Mu flag goes true or false. The input to block 1106 is the primary axle split_Mu flag. Block 1106 outputs the minimum axle speed rate limit to block 1110 when the primary axle speed control trigger value is false or a logical 0.

The vehicle speed estimate and Mu estimate are input to block 1108. In block 1108, the Mu estimate and the vehicle speed estimate index or reference a function that contains values of the desired increase of wheel slip during a split mu event. There is a unique increase in wheel slip value for each Mu estimate and vehicle speed estimate pair. The function outputs a value of additional wheel slip to block 1110. The additional wheel slip values in the function may be empirically determined via inducing slip events on different split-Mu surfaces and calibrating the additional amount of wheel slip that is required in order to allow the friction brakes to bias the most amount of torque to the high Mu wheel.

At block 1110, the output of block 1106 and the output of block 1108 are multiplied. The result of the multiplication is output from block 1110 to block 1112. Block 1112 selects the larger value of the output of block 1110 and a value of one. Block 1112 outputs the large of the two values to block 1114.

Block 1114 multiplies the output of block 1102 with the output of block 1104 to generate a first result. The first result is multiplied by the output of block 1112 to generate a second result. The second result is output from block 1114 to block 1116. Block 1116 outputs a smaller value of the output of block 1114 and a maximum wheel slip limit to summing junction 1120. The output of block 1116 is a wheel slip request or target. The vehicle speed estimate is input to block 1118 and block 1118 converts the vehicle speed into radians per second to generate a wheel speed. Block 1118 outputs the wheel speed to summing junction 1120. Summing junction 1120 adds the wheel speed and the wheel slip speed request to generate a primary axle speed target or request value. Summing junction 1120 outputs the primary axle speed target or request value.

Figure 12:
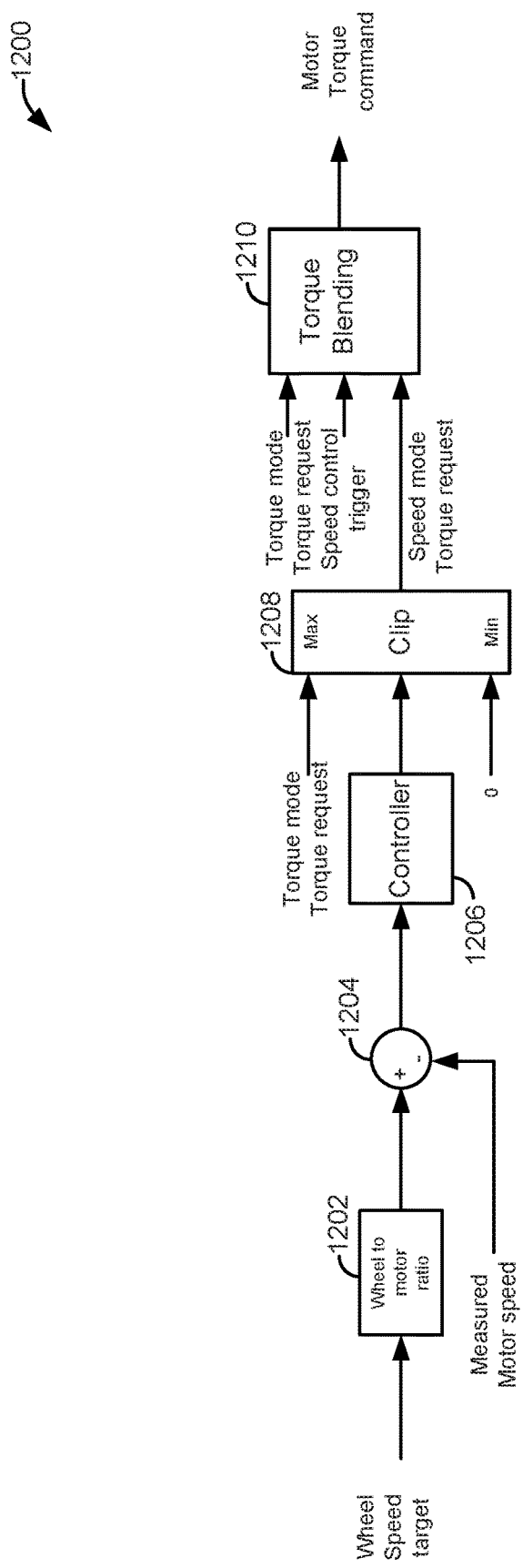

Referring now to FIG. 12, a block diagram of a closed loop wheel speed controller for wheel speed slip control is shown. The inverter controls of the primary and secondary axle typically run at very fast task rate on the order of 500 Hz. Therefore, it is the appropriate location to perform closed loop electric machine speed control. When using a traction motor (e.g., electric machine) through an open differential to power the vehicle's wheels, the traction motor speed is the average of the wheel speeds. Therefore, controlling the traction motor speed directly controls the average wheel speed of the axle. Continuous wheel slip control utilizes precise control of the wheel speed. The task of the inverter controls is to deliver the requested torque to the axle in torque control mode and the requested speed in speed control mode.

The inverter controls provide a blend between two different torque requests based on the value of the speed control trigger. When the speed control trigger is false, the torque blending strategy passes through the torque mode torque request. Thus, the axle is operated in a torque control mode. When the speed control trigger is true, the torque blending strategy blends the motor torque command from the torque mode torque request with the speed mode torque request generated by the closed loop motor speed controller. Note that the closed loop motor speed controller generates a motor torque request to regulate the motor speed to a requested speed. Likewise, when the speed control trigger flag changes from true to false, the torque command will blend from the speed mode torque request to the torque mode torque request. Within the closed loop motor speed controller, the torque request of the closed loop controller is clipped to within the torque mode torque request so as to avoid increasing the wheel torque request above the driver demand.

The wheel speed target or request from block 1120 is input to block 1202. Block 1202 multiplies the wheel speed target or request by a gear ratio that exists between the wheel and the motor to generate a requested motor speed. Block 1202 outputs the requested motor speed to summing junction 1204. A measured motor speed is subtracted from the requested motor speed at summing junction 1204 to generate a motor speed error. Summing junction 1204 outputs the motor speed error to block 1206.

Block 1206 may be any known type of controller. In one example, block 1206 is a proportional/integral controller that adjusts the motor torque responsive to a sum of a proportion of the motor speed error and the integrated motor speed error to control motor speed. Thus, the output of block 1206 is a motor speed control mode torque request. Alternatively, block 1206 may a linear quadratic regular, or another known controller. Block 1206 outputs a motor speed control motor torque command that is input to block 1208.

A motor torque mode torque request, a speed control trigger, and speed control mode torque request are input to block 1208. The motor torque mode torque request is determined from a driver demand torque. The driver demand torque is determined via referencing a table or function of driver torque demands via accelerator pedal position and vehicle speed. The driver demand values that are stored in the table may be empirically determined via operating the vehicle on a dynamometer and adjusting driver demand torque values while adjusting accelerator pedal position and vehicle speed until acceptable vehicle response is provided.

Block 1208 passes the driver demand torque request through itself with no adjustments when the speed control trigger value is false or a logical zero. Block 1208 outputs a blend of the driver demand torque and the speed mode torque command when the speed control trigger value is true or a logical one. The blend of driver demand torque and speed mode torque may be performed for a predetermined duration before the electric machine torque command is equal to only the speed mode torque command. For example, block 1208 may initially output a sum of 90% of the driver demand torque and 10% of the speed control torque request. As time goes on, block 1208 may output a sum of 30% of the driver demand torque and 70% of the speed mode torque command. After a predetermined amount of time has elapsed, the electric machine command is equal to 100% of the speed mode torque request and 0% of the torque mode torque request. The output of block 1208 is delivered to the inverter and the inverter adjust current and/or voltage that is supplied to the electric machine to provide the torque request value that is output from block 1208.

In this way, the method of FIGS. 2-12 may change from operating an axle in a torque mode to operating the axle in a speed control mode in response to detecting wheel slip. Further, the method adjusts electric machine torque while operating in the speed control mode via blending a torque mode torque command and a speed mode torque command.

Thus, the method of FIGS. 2-12 provides for a method for operating a vehicle, comprising: operating an electric machine of a first axle in a torque control mode via a controller; and exiting the torque control mode and entering the electric machine of the first axle in to a speed control mode via the controller in response to an indication of a wheel of the first axle slipping. The method further comprises adjusting torque of the electric machine of the first axle in response to a driver demand torque in absence of the indication of the wheel of the first axle slipping. The method includes where operating in the speed control mode includes adjusting torque of the electric machine of the first axle such that the electric machine of the first axle follows a requested speed. The method includes where the requested speed is a function of accelerator pedal position and vehicle speed. The method includes where the requested speed is a function of vehicle speed and a vehicle yaw rate. The method includes where the requested speed is a function of vehicle speed and an estimated coefficient of friction. The method includes where the speed control mode is a closed-loop speed control mode.

The method of FIGS. 2-12 also provides for a method for operating a vehicle, comprising: operating an electric machine of a first axle in a first torque control mode and an electric machine of a second axle in a second torque control mode via a controller; and exiting the first torque control mode and entering the electric machine of the first axle into a first speed control mode via the controller in response to an indication of a wheel of the first axle slipping and continuing to operate the electric machine of the second axle in the second torque control mode in response to an absence of an indication of a wheel of the second axle slipping. The method further comprises requesting a first torque from the electric machine of the first axle based on a driver demand torque when operating the electric machine of the first axle in the first torque control mode and requesting a second torque from the electric machine of the second axle based on the driver demand torque when operating the electric machine of the second axle in the second torque control mode, the first torque plus the second torque equal to the driver demand torque.

In some examples, the method further comprises adjusting the second torque of the electric machine of the second axle in response to the driver demand torque and a speed control mode torque of the electric machine of the first axle. The method further comprises exiting the second torque control mode and entering the electric machine of the second axle into a second speed control mode via the controller in response to an indication of a wheel of the second axle slipping. The method further comprises exiting the first torque control mode and entering the electric machine of the first axle into the first speed control mode in response to a vehicle yaw rate error. The method further comprises exiting the first torque control mode and entering the electric machine of the first axle into the first speed control mode in response to an a split-Mu indication.

In another representation, the method of FIGS. 2-12 provide for a method for operating a vehicle, comprising: operating an electric machine of a first axle in a torque control mode in response to entering a first state of a state machine via a controller; and exiting the torque control mode and entering the electric machine of the first axle in to a speed control mode via the controller in response to entering a second state of the state machine, the second state entered in when a predetermined group of conditions are met. The method further comprising entering a third state of the state machine before returning to the first state. The method includes where the third state is entered in response to a second predetermined group of conditions being met.

Referring now to FIG. 13, a vehicle operating sequence according to the method of FIGS. 2-12 and the system of FIG. 1 is shown. The sequence of FIG. 13 may be provided via the system of FIG. 1 in cooperation with the method of FIGS. 2-12. Vertical lines at times t0-t3 show times if particular interest in the sequence.

The first plot from the top of FIG. 13 is a plot of speed versus time. The vertical axis represents axle speed and axle speed increases in the direction of the vertical axis arrow. The horizontal axis represents time and time increases from the left side of the figure to the right side of the figure. Dashed line trace 1302 represents requested primary axle speed. Dot-dashed line 1304 represents actual primary axle speed. Solid line 1306 represents an estimated vehicle speed.

The second plot from the top of FIG. 13 is a plot of speed versus time. The vertical axis represents axle speed and axle speed increases in the direction of the vertical axis arrow. The horizontal axis represents time and time increases from the left side of the figure to the right side of the figure. Dashed line trace 1308 represents requested secondary axle speed. Dot-dashed line 1310 represents actual secondary axle speed. Solid line 1312 represents an estimated vehicle speed.

The third plot from the top of FIG. 13 is a plot of speed control trigger state versus time. The vertical axis represents the speed control trigger state and the speed control trigger is asserted or activated when a trace is near the vertical axis arrow. A speed control trigger state is not asserted or activated when a trace is near the horizontal axis. The horizontal axis represents time and time increases from the left side of the figure to the right side of the figure. Dashed line trace 1316 represents secondary axle speed control trigger state. Solid line 1314 represents primary axle speed control trigger state.

The fourth plot from the top of FIG. 13 is a plot of accelerator pedal position versus time. The vertical axis represents accelerator pedal position and accelerator pedal position increases (e.g., is applied farther) in the direction of the vertical axis arrow. The horizontal axis represents time and time increases from the left side of the figure to the right side of the figure. Trace 1318 represents the accelerator pedal position.

The fifth plot from the top of FIG. 13 is a plot of primary axle torque versus time. The vertical axis represents primary axle torque and primary axle torque increases in the direction of the vertical axis arrow. The horizontal axis represents time and time increases from the left side of the figure to the right side of the figure. Dashed line trace 1320 represents requested primary axle torque mode torque request. Dot-dashed line 1324 represents primary axle speed control mode torque request. Solid line 1322 represents the primary axle torque request command that is delivered to the inverter that controls primary axle electric machine torque.

The sixth plot from the top of FIG. 13 is a plot of secondary axle torque versus time. The vertical axis represents secondary axle torque and secondary axle torque increases in the direction of the vertical axis arrow. The horizontal axis represents time and time increases from the left side of the figure to the right side of the figure. Dashed line trace 1326 represents requested secondary axle torque mode torque request. Dot-dashed line 1330 represents secondary axle speed control mode torque request. Solid line 1328 represents the secondary axle torque request command that is delivered to the inverter that controls secondary axle electric machine torque.

At time t0, the accelerator pedal begins to be applied via the vehicle's driver (not shown). The actual primary axle speed, requested primary axle speed, and the vehicle speed begin to increase. Likewise, the actual secondary axle speed, requested secondary axle speed, and the vehicle speed begin to increase. Speed control is not triggered for the axles and the primary and secondary axle torques increase with the increasing accelerator pedal position. The primary and secondary axle speed control torque requests are zero since the speed control triggers are not asserted.

At time t1, the driver (not shown) has applied enough accelerator pedal input such that the primary axle speed experiences a significant slip overrun which causes the primary axle control trigger to be asserted. At this point, the primary axle closed loop wheel speed controller takes over and it tracks the wheel speed target. The primary axle torque request command begins blending from the torque mode torque request to the speed mode torque request.

Between time t1 and t2, the primary axle is operating in speed control mode and the secondary axle is operating in torque control mode. The actual primary axle speed reaches a peak value and then it decreases as the primary axle torque request command is reduced from the torque mode torque request toward the speed mode torque request. The secondary axle torque request command is equal to the secondary axle torque mode torque request.

At time t2, the secondary axle experiences a significant slip overrun which triggers the secondary axle slip control. The secondary axle closed loop wheel speed controller takes over and it tracks the wheel speed target. The secondary axle torque request command begins blending from the torque mode torque request to the speed mode torque request.

Between time t2 and t3, the primary axle continues operating in speed control mode and the secondary axle is also operating in speed control mode. The actual primary axle speed follows the primary axle speed request and the secondary axle speed reaches a peak value and then it decreases as the secondary axle torque request command is reduced from the torque mode torque request toward the speed mode torque request. The secondary axle torque request command and the primary axle torque request command are equal to their respective speed mode torque requests shortly after time t2.

At time t3, the driver (not shown) releases the accelerator pedal, which causes both axles to exit speed control mode. The torque command of each axle blends to the torque mode requests of their respective axle when the speed mode request intercepts the torque mode request for the respective axle. After time t3, both axles operate in torque control mode. Thus, each axle has its own independent slip control and each axle is operated in a speed control mode in response to wheel slip being detected. The axles can independently operate in speed or torque control depending on the state of the speed control trigger flag.

Referring now to FIG. 14, a vehicle operating sequence according to the method of FIGS. 2-12 and the system of FIG. 1 is shown. The sequence of FIG. 13 may be provided via the system of FIG. 1 in cooperation with the method of FIGS. 2-12. Vertical lines at times t10-t13 show times if particular interest in the sequence.

The first plot from the top of FIG. 14 is a plot of speed versus time. The vertical axis represents axle speed and axle speed increases in the direction of the vertical axis arrow. The horizontal axis represents time and time increases from the left side of the figure to the right side of the figure. Dashed line trace 1402 represents requested primary axle speed. Dot-dashed line 1404 represents actual primary axle speed. Solid line 1406 represents an estimated vehicle speed.

The second plot from the top of FIG. 14 is a plot of speed versus time. The vertical axis represents axle speed and axle speed increases in the direction of the vertical axis arrow. The horizontal axis represents time and time increases from the left side of the figure to the right side of the figure. Dashed line trace 1408 represents requested secondary axle speed. Dot-dashed line 1410 represents actual secondary axle speed. Solid line 1412 represents an estimated vehicle speed.

The third plot from the top of FIG. 14 is a plot of speed control trigger state versus time. The vertical axis represents the speed control trigger state and the speed control trigger is asserted or activated when a trace is near the vertical axis arrow. A speed control trigger state is not asserted or activated when a trace is near the horizontal axis. The horizontal axis represents time and time increases from the left side of the figure to the right side of the figure. Dashed line trace 1416 represents secondary axle speed control trigger state. Solid line 1414 represents primary axle speed control trigger state.

The fourth plot from the top of FIG. 14 is a plot of primary and secondary axle split-Mu flag variables versus time. The vertical axis represents the state of the primary and secondary axle split-Mu flags and a split-Mu flag is asserted when a trace is at a higher level near the vertical axis arrow. The split-Mu flags are not asserted when the traces are near the horizontal axis. The horizontal axis represents time and time increases from the left side of the figure to the right side of the figure. Solid line trace 1414 represents a split-Mu state of a primary axle and dashed line trace 1416 represents a split-Mu state of a secondary axle.

At time t10, the accelerator pedal begins to be applied via the vehicle's driver (not shown). The actual primary axle speed, requested primary axle speed, and the vehicle speed begin to increase. Likewise, the actual secondary axle speed, requested secondary axle speed, and the vehicle speed begin to increase. Speed control is not triggered for the axles and the primary and secondary axle torques increase with the increasing accelerator pedal position. The split-Mu flag is not asserted.

At time t11, the primary axle experiences significant wheel slip overrun and the primary axle speed control trigger is engaged. The primary axle closed loop wheel speed controller takes over to control the wheel slip of the primary axle.

At time t12, shortly after the slip control is activated, the primary axle split-Mu flag triggers true indicating that the primary axle is operating on a split-Mu surface. Once the primary axle split-Mu flag is triggered, the primary axle speed target is increased in order to increase the total torque on the primary axle. The brake controls now have enough torque at the axle to bias the torque to the high Mu wheel. The brake controller may begin to apply the friction brakes of the front axle at this time.

At time t3, the split-Mu flag deactivates and the speed target blends back down to its original value. Note that the secondary axle stayed in torque control throughout this entire event. The split-Mu detecting and slip control operates independently for each axle.

Referring now to FIG. 15, a vehicle operating sequence according to the method of FIGS. 2-12 and the system of FIG. 1 is shown. The sequence of FIG. 15 may be provided via the system of FIG. 1 in cooperation with the method of FIGS. 2-12. Vertical lines at times t20-t23 show times if particular interest in the sequence.

The first plot from the top of FIG. 15 is a plot of speed versus time. The vertical axis represents axle speed and axle speed increases in the direction of the vertical axis arrow. The horizontal axis represents time and time increases from the left side of the figure to the right side of the figure. Dashed line trace 1502 represents requested primary axle speed. Dot-dashed line 1504 represents actual primary axle speed. Solid line 1506 represents an estimated vehicle speed.

The second plot from the top of FIG. 15 is a plot of speed versus time. The vertical axis represents axle speed and axle speed increases in the direction of the vertical axis arrow. The horizontal axis represents time and time increases from the left side of the figure to the right side of the figure. Dashed line trace 1508 represents requested secondary axle speed. Dot-dashed line 1510 represents actual secondary axle speed. Solid line 1512 represents an estimated vehicle speed.

The third plot from the top of FIG. 15 is a plot of speed control trigger state versus time. The vertical axis represents the speed control trigger state and the speed control trigger is asserted or activated when a trace is near the vertical axis arrow. A speed control trigger state is not asserted or activated when a trace is near the horizontal axis. The horizontal axis represents time and time increases from the left side of the figure to the right side of the figure. Dashed line trace 1516 represents secondary axle speed control trigger state. Solid line 1514 represents primary axle speed control trigger state.

The fourth plot from the top of FIG. 14 is a plot of vehicle yaw rate error versus time. The vertical axis represents the vehicle yaw rate error and the yaw rate error at the level of the horizontal axis is zero. The magnitude of yaw rate error increases in the direction of the vertical axis arrows. The horizontal axis represents time and time increases from the left side of the figure to the right side of the figure. Solid line trace 1512 represents the vehicle yaw rate error.

At time t20, the accelerator pedal begins to be applied via the vehicle's driver (not shown). The actual primary axle speed, requested primary axle speed, and the vehicle speed begin to increase. Likewise, the actual secondary axle speed, requested secondary axle speed, and the vehicle speed begin to increase. Speed control is not triggered for the axles and the primary and secondary axle torques increase with the increasing accelerator pedal position. The vehicle yaw rate error is near zero.

At time t21, both axles experience significant slip overrun which triggers speed control for both axles. The axle speed increases and then it decreases as the axle speed control activates and reduces the torque delivered via each axle.

At time t23, the vehicle yaw rate error indicates that the vehicle is experiencing significant oversteer. In order to correct oversteer, the method adjusts the wheel speed target of the primary and secondary axles so as to bring the yaw rate error back down to neutral. Once yaw rate error is back at neutral, the speed targets or requests are blended back to their base target values. Note that the method may adjust the yaw rate when one axle is in speed control mode and the other is in torque control mode.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operating a vehicle, comprising:
operating an electric machine of a first axle in a torque control mode via a controller; and
exiting the torque control mode and entering the electric machine of the first axle in to a speed control mode via the controller in response to a lateral acceleration of the vehicle.

2. The method of claim 1, further comprising adjusting torque of the electric machine of the first axle in response to a driver demand torque in absence of the indication of the wheel of the first axle slipping.

3. The method of claim 1, where operating in the speed control mode includes adjusting torque of the electric machine of the first axle such that the electric machine of the first axle follows a requested speed.

4. The method of claim 3, where the requested speed is a function of accelerator pedal position and vehicle speed.

5. The method of claim 3, where the requested speed is a function of vehicle speed and a vehicle yaw rate.

6. The method of claim 3, where the requested speed is a function of vehicle speed and an estimated coefficient of friction.

7. The method of claim 1, where the speed control mode is a closed-loop speed control mode.

8. A vehicle system, comprising:
a first electric machine coupled to a first axle;
a second electric machine coupled to a second axle;
a controller including executable instructions stored in non-transitory memory to operate the first electric machine in a first torque control mode and the second electric machine in a second torque control mode in response to absence of wheel slip, and to operate the first electric machine or the second electric machine in a speed control mode in response to an indication of wheel slip, and additional instructions to adjust a requested speed of the first electric machine or a requested speed of the second electric machine in the speed control mode in response to vehicle speed and vehicle yaw rate error.

9. The vehicle system of claim 8, further comprising additional instructions to adjust a requested speed in the speed control mode in response to vehicle speed and accelerator pedal position.

10. The vehicle system of claim 8, where the speed control mode is a closed-loop speed control mode where a rotational speed of the first axle is subtracted from a requested speed of the first axle.

11. The vehicle system of claim 8, further comprising additional instructions to operate the first electric machine or the second electric machine in the speed control mode in response to a vehicle yaw rate error.

12. The vehicle system of claim 8, further comprising additional instructions to operate the first electric machine or the second electric machine in the speed control mode in response to an indication of a split coefficient of friction.

13. The vehicle system of claim 8, further comprising additional instructions to blend a torque command of the first electric machine based on a torque in the first torque control mode and a torque in the speed control mode.

14. A method for operating a vehicle, comprising:
operating an electric machine of a first axle in a first torque control mode and an electric machine of a second axle in a second torque control mode via a controller;
exiting the first torque control mode and entering the electric machine of the first axle into a first speed control mode via the controller in response to an indication of a wheel of the first axle slipping and continuing to operate the electric machine of the second axle in the second torque control mode in response to an absence of an indication of a wheel of the second axle slipping; and
exiting the first torque control mode and entering the electric machine of the first axle into the first speed control mode in response to a vehicle yaw rate error.

15. The method of claim 14, further comprising requesting a first torque from the electric machine of the first axle based on a driver demand torque when operating the electric machine of the first axle in the first torque control mode and requesting a second torque from the electric machine of the second axle based on the driver demand torque when operating the electric machine of the second axle in the second torque control mode, the first torque plus the second torque equal to the driver demand torque.

16. The method of claim 15, further comprising adjusting the second torque of the electric machine of the second axle in response to the driver demand torque and a speed control mode torque of the electric machine of the first axle.

17. The method of claim 15, further comprising exiting the second torque control mode and entering the electric machine of the second axle into a second speed control mode via the controller in response to an indication of a wheel of the second axle slipping.

18. The method of claim 14, further comprising exiting the first torque control mode and entering the electric machine of the first axle into the first speed control mode in response to a split-Mu indication.

* * * * *